United States Patent
Mullaney et al.

(10) Patent No.: US 9,802,786 B2
(45) Date of Patent: Oct. 31, 2017

(54) CORELESS WOUND COIL DISPENSER WITH OPTIONAL CABLE STORAGE FOR AN OPTICAL TERMINAL NETWORK

(71) Applicant: CommScope Technologies LLC, Hickory, NC (US)

(72) Inventors: Julian S. Mullaney, Raleigh, NC (US); Eric E. Alston, Fuquay-Varina, NC (US); William Alan Carrico, Raleigh, NC (US); Erik J. Gronvall, Bloomington, MN (US); Kathleen Terryll, Chaska, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 38 days.

(21) Appl. No.: 14/975,021

(22) Filed: Dec. 18, 2015

(65) Prior Publication Data

US 2016/0207723 A1 Jul. 21, 2016

Related U.S. Application Data

(60) Provisional application No. 62/094,656, filed on Dec. 19, 2014, provisional application No. 62/233,841, (Continued)

(51) Int. Cl.
*B65H 55/04* (2006.01)
*B65H 55/02* (2006.01)
(Continued)

(52) U.S. Cl.
CPC ........... *B65H 55/046* (2013.01); *B65H 55/02* (2013.01); *G02B 6/4448* (2013.01); (Continued)

(58) Field of Classification Search
CPC .. B65H 55/02; B65H 55/046; B65H 2701/32; G02B 6/4448; G02B 6/4457; G02B 6/4466
See application file for complete search history.

(56) References Cited

U.S. PATENT DOCUMENTS

2008/0285933 A1  11/2008  Vogel et al.
2009/0097845 A1   4/2009  Campbell
(Continued)

FOREIGN PATENT DOCUMENTS

JP   2007-119164   5/2007

OTHER PUBLICATIONS

International Search Report and Written Opinion for Application No. PCT/US2015/066892 mailed Apr. 12, 2016.

*Primary Examiner* — William E Dondero
(74) *Attorney, Agent, or Firm* — Merchant & Gould P.C.

(57) ABSTRACT

Packaged dispensers mountable to optical network terminals (ONT) are disclosed. In some examples, the dispensers include coreless wound coils and excess storage areas. Additionally, fiber optic cable distribution systems and methods thereof utilizing the disclosed coreless wound coils are further disclosed. In one example, a length of telecommunications cable is wound into a coreless coil that includes a plurality of winding separators at least partially embedded within the coil, wherein the length of telecommunications cable alternately passes on one of the first and second sides of one winding separator and on the other of the first and second sides of an adjacent winding separator. In one example, an initially cylindrically shaped coreless wound coil, with or without winding separators, can be placed into a non-round package in which the wound coil is deformed and compressed by the sidewalls of the package such that the
(Continued)

coreless wound coil conforms to the interior perimeter of the package to have a non-cylindrical shape.

23 Claims, 40 Drawing Sheets

Related U.S. Application Data filed on Sep. 28, 2015, provisional application No. 62/268,473, filed on Dec. 16, 2015.

(51) Int. Cl.
*G02B 6/44* (2006.01)
*H04B 10/25* (2013.01)

(52) U.S. Cl.
CPC ........... *G02B 6/4457* (2013.01); *H04B 10/25* (2013.01); *B65H 2701/32* (2013.01); *G02B 6/4466* (2013.01)

(56) References Cited

U.S. PATENT DOCUMENTS

| | | |
|---|---|---|
| 2014/0020815 A1 | 1/2014 | Dickinson et al. |
| 2014/0259602 A1 | 9/2014 | Thompson |

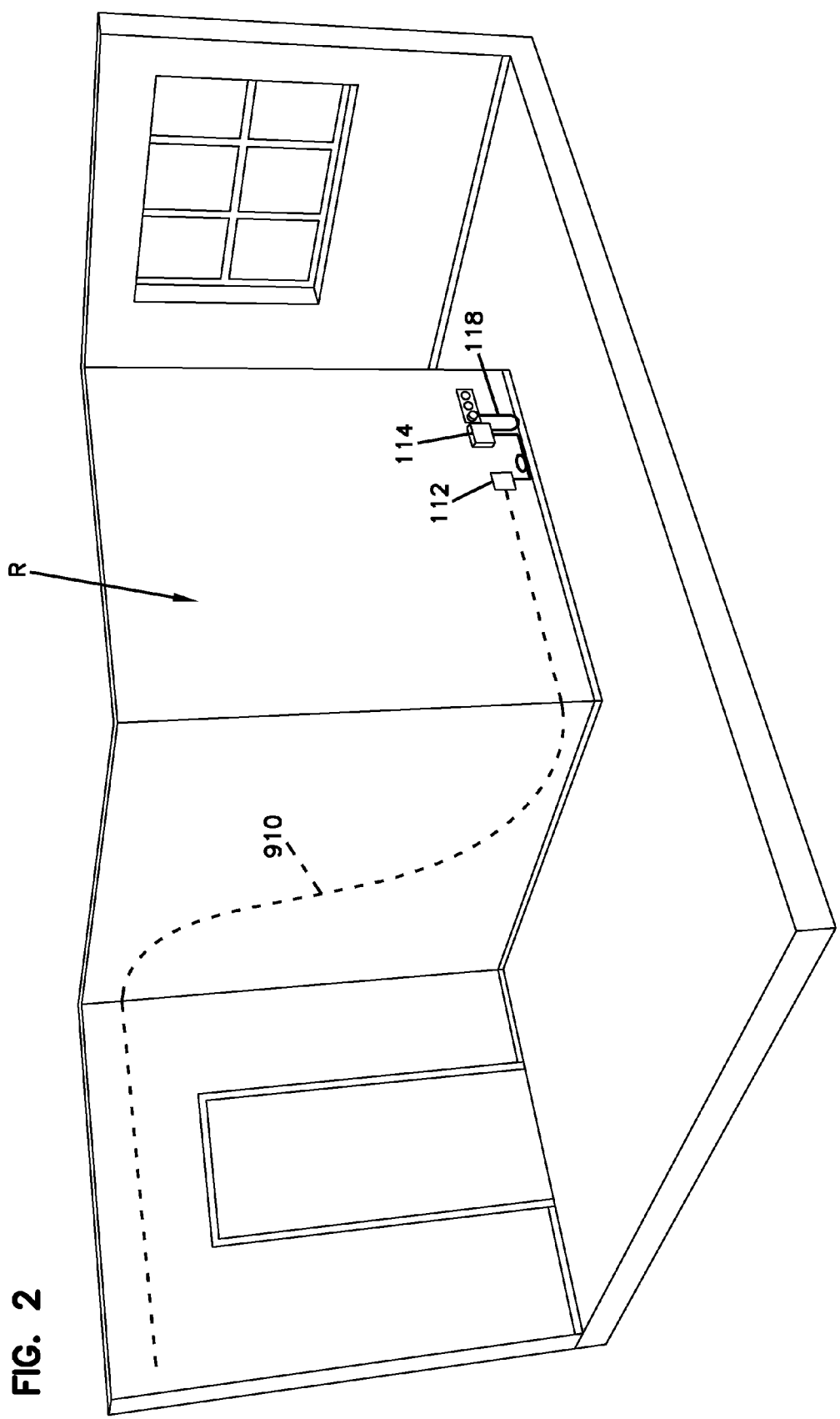

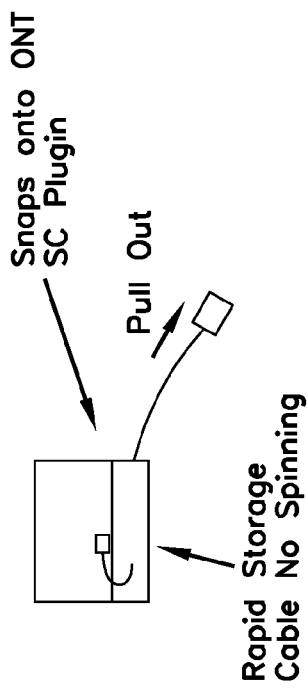
FIG. 5
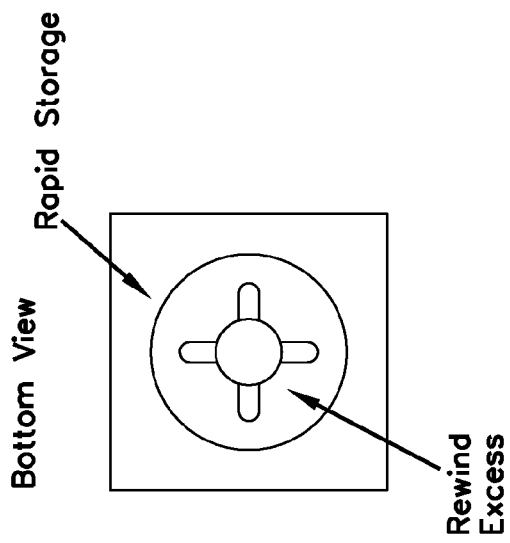
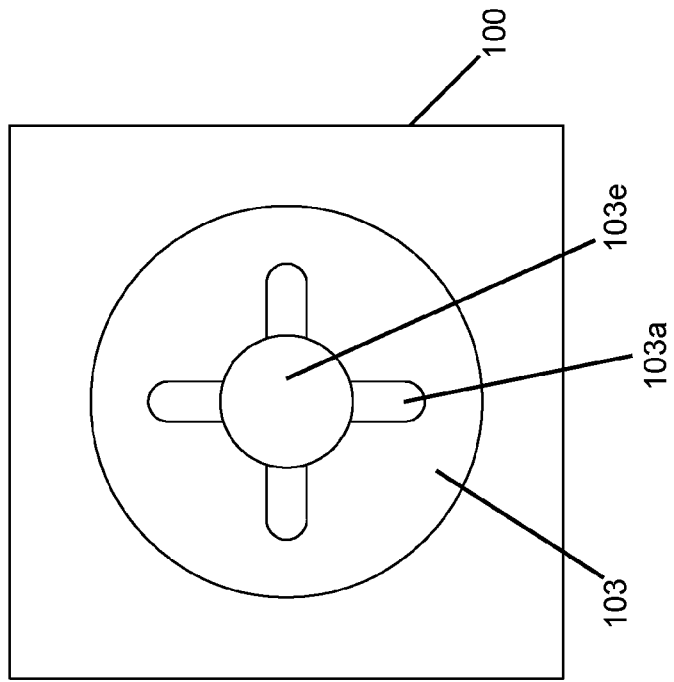
FIG. 4

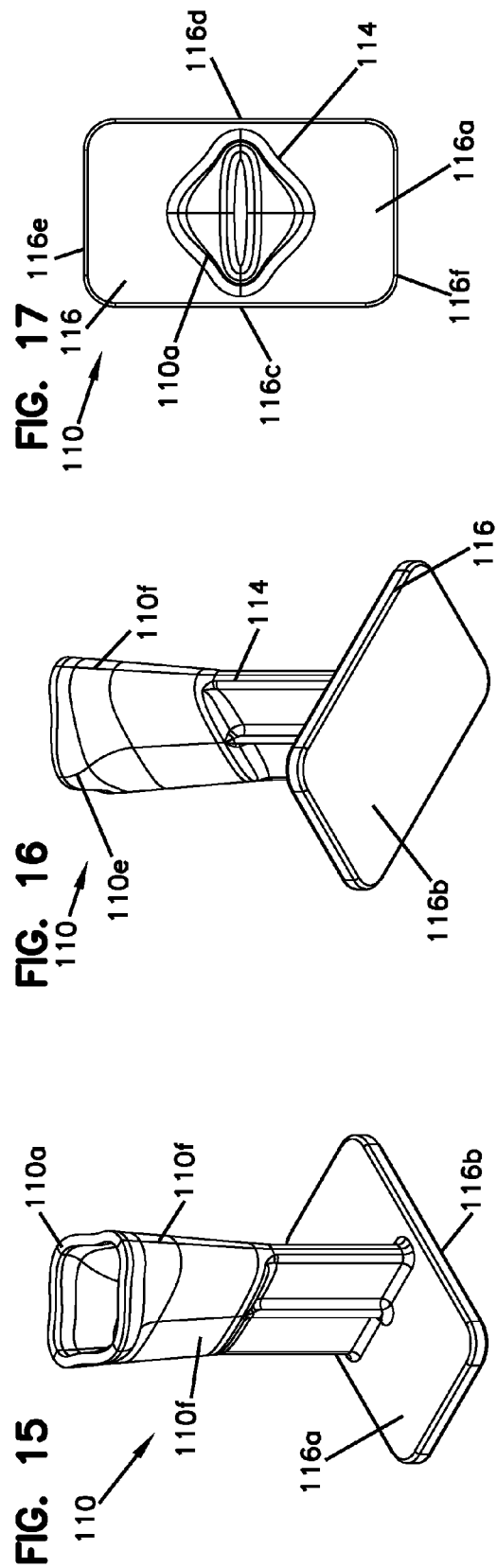
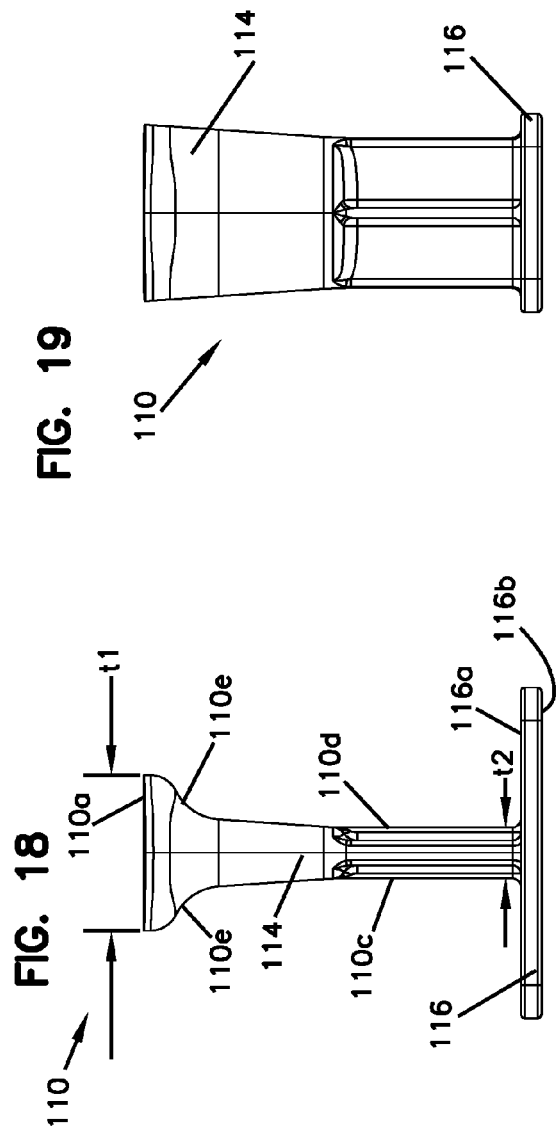

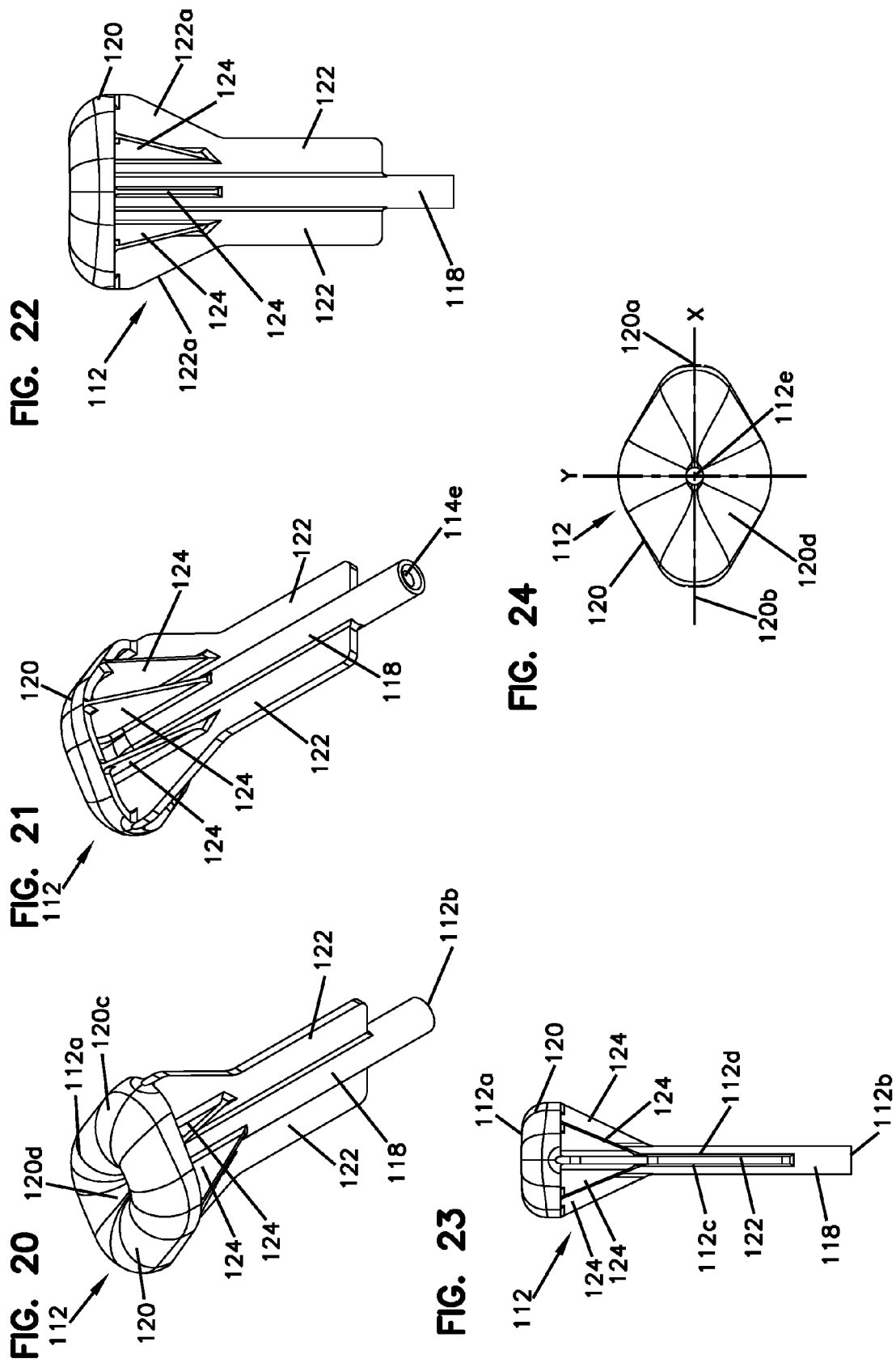

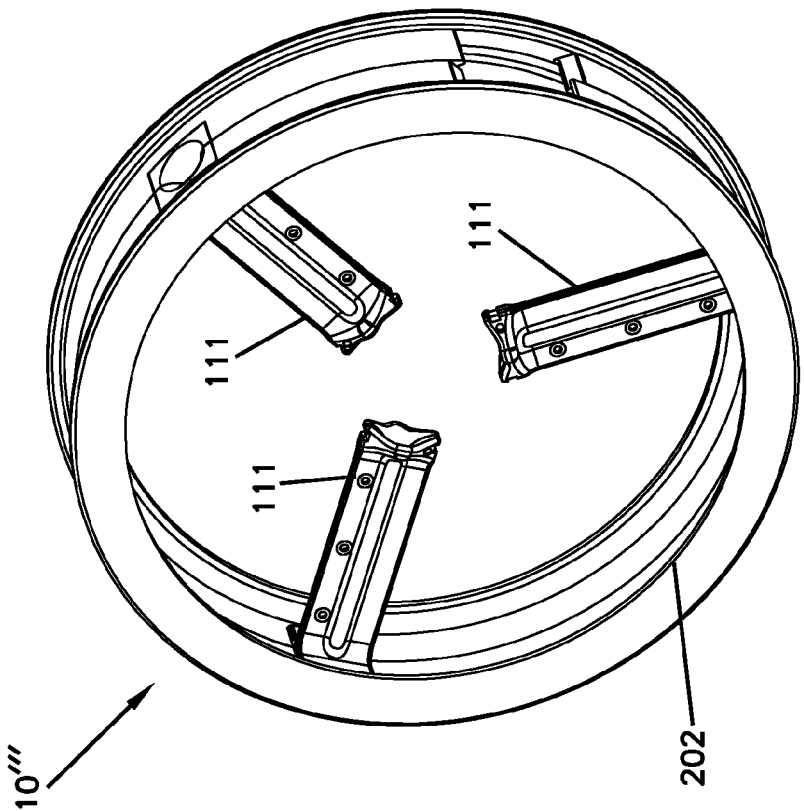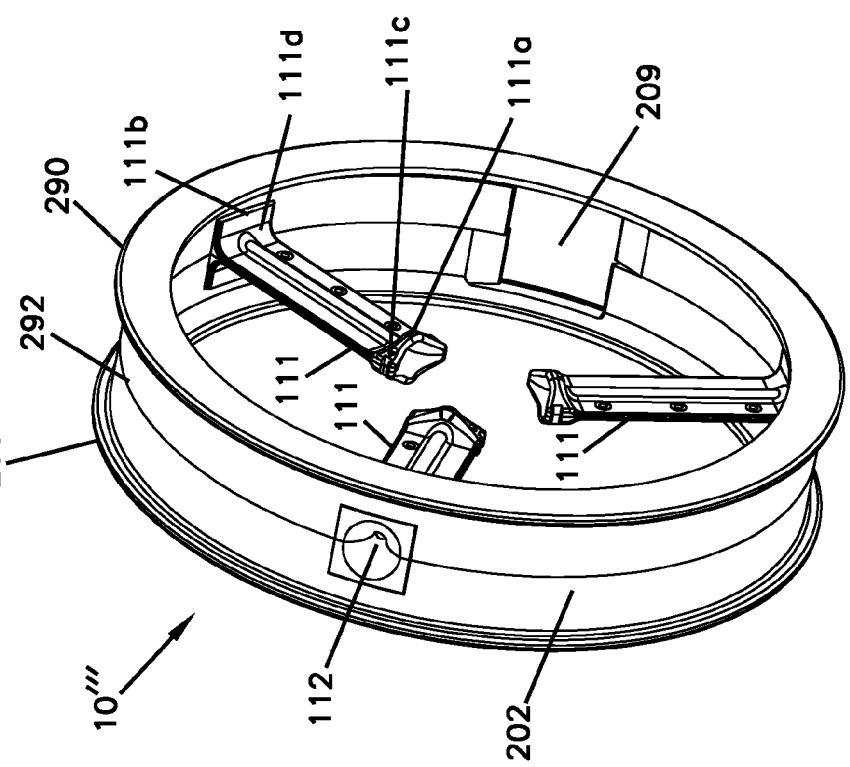

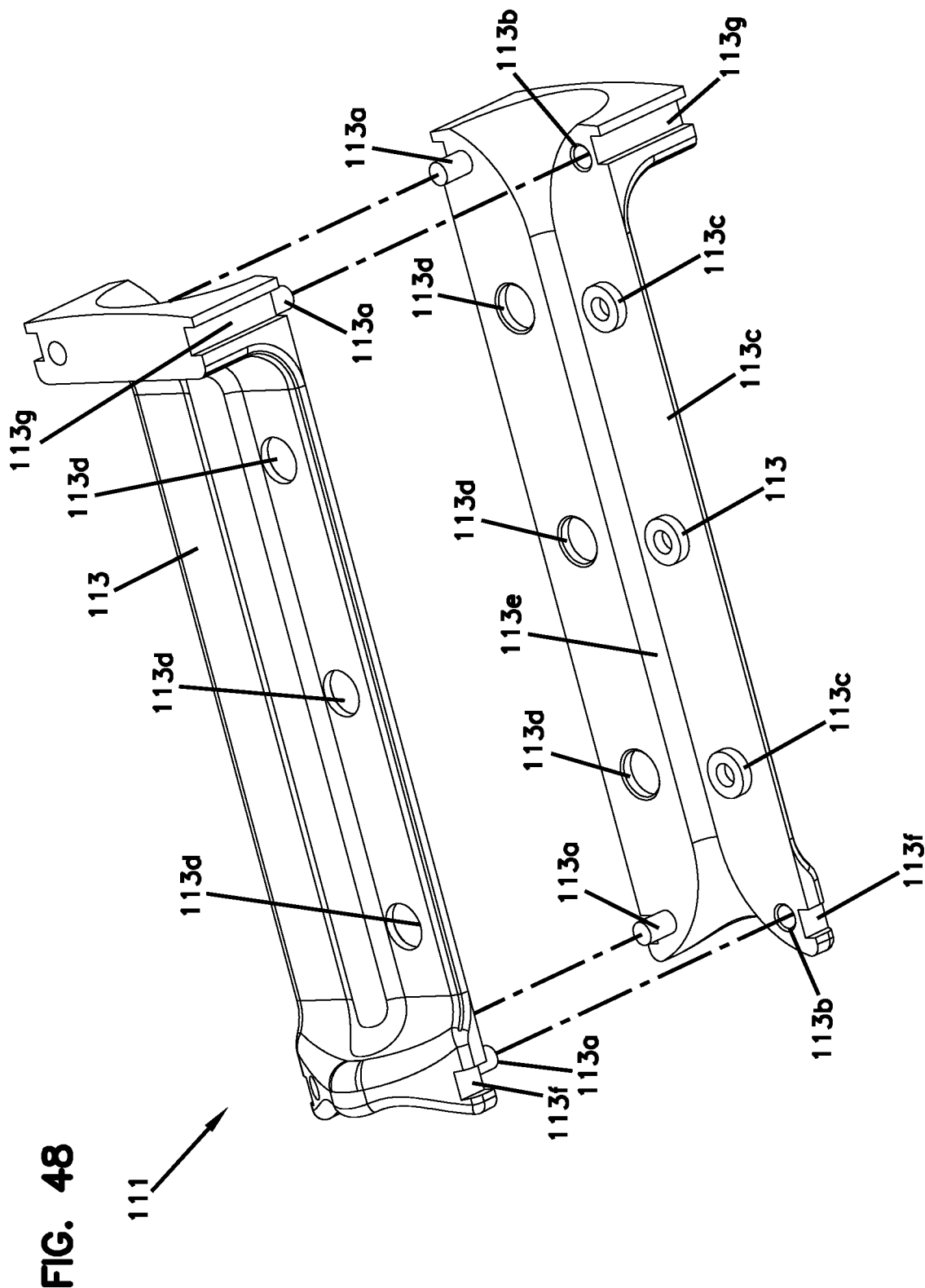

CORELESS WOUND COIL DISPENSER WITH OPTIONAL CABLE STORAGE FOR AN OPTICAL TERMINAL NETWORK

CROSS REFERENCE TO RELATED APPLICATIONS

This application claims the benefit of U.S. Provisional Application No. 62/094,656, filed Dec. 19, 2014, and titled "Fiber Distribution System and Coreless Wound Coil" and U.S. Provisional Application No. 62/233,841, filed Sep. 28, 2015, and titled "Coreless Wound Coil Dispenser with Cable Storage for an Optical Terminal Network" and U.S. Provisional Application No. 62/268,473, filed Dec. 16, 2015, and titled "Coreless Wound Coil Dispenser with Optional Cable Storage for an Optical Terminal Network," the disclosures of which are hereby incorporated by reference in their entireties.

BACKGROUND

The demand for the installation of fiber optic telecommunications cables within existing building structures, for example multiple dwelling units (MDU's), has recently increased. However, providing for such installations can be challenging using conventional optical fiber installation techniques and standard optical fiber cable sizes. For example, pulling long riser cables in buildings with congested cable pathways can be extremely difficult and time consuming. At the concentration points of the cables, for example, a basement, many times the fiber density is too high to provide for adequate organization and can also present a fire hazard. Due to this congestion, the number of cable splicing locations increases, especially where congestion prevents the use of pre-connectorized cables. This further increases costs and also increases the skill level requirement for field installers. Additionally, winding techniques used for conventionally sized fiber optic cables can be problematic when applied to winding fiber optic cables of a smaller dimension and of the type that may be more suitable for installation in a pre-existing building structure with limited available space.

SUMMARY

In one aspect of the disclosure, a packaged cable dispenser including a coreless wound coil disposed in a package is disclosed. The wound coil can be a length of telecommunications cable that has been wound into a coreless coil. The wound coil can also include a plurality of winding separators at least partially embedded within the coil wherein the length of telecommunications cable alternately passes on one of the first and second sides of one winding separator and on the other of the first and second sides of an adjacent winding separator. The wound coil can be disposed in a package, wherein one of the winding separators is a payout tube extending from an interior winding surface of the coreless coil to the exterior of the package.

In another aspect of the disclosure, a packaged wound coil is disclosed including a non-cylindrical package having a plurality of interconnected sidewalls defining an interior perimeter. The packaged wound coil can further include a length of telecommunications cable wound into a coreless coil having an interior winding surface and an exterior winding surface, the interior winding surface defining a hollow interior, the exterior winding surface defining an outside dimension. The coreless coil can be deformed and compressed by the interconnected sidewalls of the package such that the coreless coil conforms to the interior perimeter of the package. A payout tube can also be provided that extends the coreless coil between the hollow interior to the exterior surface of the coreless coil and through one of the interconnected sidewalls of the package, a portion of the telecommunications cable extending through the payout tube.

In another aspect, a telecommunications distribution system for a building structure is disclosed. The system can include a conduit assembly extending through at least two floors of the building structure, wherein a telecommunications cable extends through the conduit assembly. The telecommunications cable can be pulled from a wound coil including any of the aforementioned features, for example, a coreless coil with winding separators and/or a coreless coil that is compressed by the sidewalls of the package.

A method for installing a telecommunications distribution system within a building structure is also disclosed. One step can be installing a conduit assembly extending through at least two floors of the building structure. Another step can be providing a wound coil including any of the aforementioned features, for example, a coreless coil with winding separators and/or a coreless coil that is compressed by the sidewalls of the package. Another step can be installing the length of telecommunications cable within the conduit assembly by pulling cable from the wound coil.

In one example, a coreless wound coil can be manufactured by providing a mandrel assembly having a longitudinal axis about which the mandrel is rotatable and by providing an odd number of at least three winding separators, wherein each of the winding separators has a first side and an opposite second side. Other steps can be securing the winding separators to the mandrel assembly, securing an end of the telecommunications cable to the mandrel, and rotating the mandrel assembly to cause the telecommunications cable to be wound about the mandrel to form a wound coil of telecommunications cable. The telecommunications cable can be woven between the winding separators as the telecommunications cable is being wound onto the mandrel such that the telecommunications cable alternately passes on one of the first and second sides of one winding separator and on the other of the first and second sides of an adjacent winding separator. The wound coil with the winding separators remaining embedded in the coil can then be removed from the mandrel and placed in a package, if desired.

In one example, a coreless wound coil can be manufactured by providing a mandrel assembly, securing an end of the telecommunications cable to the mandrel, rotating the mandrel assembly to cause the telecommunications cable to be wound about the mandrel to form a generally cylindrical-shaped wound coil having an initial outside dimension, and removing the wound coil from the mandrel assembly. A package can be provided defining an interior having a first interior dimension that is smaller than the wound coil first outside dimension. The coreless wound coil can be installed into the package by deforming the wound coil to have a non-cylindrical shape conforming to the interior of the package such that the wound coil has a deformed outside dimension smaller than the initial outside dimension and such that the coil is compressed by the sidewalls of the package.

The dispenser can be provided with a second section defined within the package that is for storing cable that has been removed from the dispenser but is not needed. In one aspect, the storage section can include a spool portion extending from a common wall between the first section (wound coil) and the storage section. The spool portion can be configured to store excess lengths of the telecommunications cable that has been removed from the coreless coil. In a further aspect, the dispenser can be configured for mounting to an optical terminal network (ONT).

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 2 is a schematic representation of an example residence in which a subscriber cable is deployed to an optical network terminal (ONT) having rapid cable deployment and storage features.

FIG. 4 is a view of an example configuration of the cable storage features of the ONT shown in FIGS. 3A and 3B.

FIG. 5 is a view of an example configuration of the ONT shown in FIG. 2.

FIG. 15 is a top perspective view of a winding separator of the packaged cable dispenser of FIG. 9.

FIG. 16 is a bottom perspective view of the winding separator shown in FIG. 15.

FIG. 17 is a top view of the winding separator shown in FIG. 15.

FIG. 18 is a first side view of the winding separator shown in FIG. 15.

FIG. 19 is a second side view of the winding separator shown in FIG. 15.

FIG. 20 is a top perspective view of a payout tube of the packaged cable dispenser of FIG. 5.

FIG. 21 is a bottom perspective view of the payout tube shown in FIG. 20.

FIG. 22 is a first side view of the winding separator shown in FIG. 15.

FIG. 23 is a second side view of the winding separator shown in FIG. 15.

FIG. 24 is a top view of the winding separator shown in FIG. 15.

FIG. 45 is a schematic perspective view of a fourth embodiment of a packaged cable dispenser for holding a coreless wound coil having exemplary features of aspects in accordance with the principles of the present disclosure.

FIG. 46 is a second perspective view of the dispenser shown in FIG. 45.

FIG. 48 is a perspective view of a disassembled winding separator of the dispenser shown in FIG. 45.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts. Some of the features in this disclosure are similar to those shown and described in U.S. Patent Application Ser. No. 62/151,239, filed on Apr. 22, 2015, the entirety of which is incorporated by reference.

Figure 1:
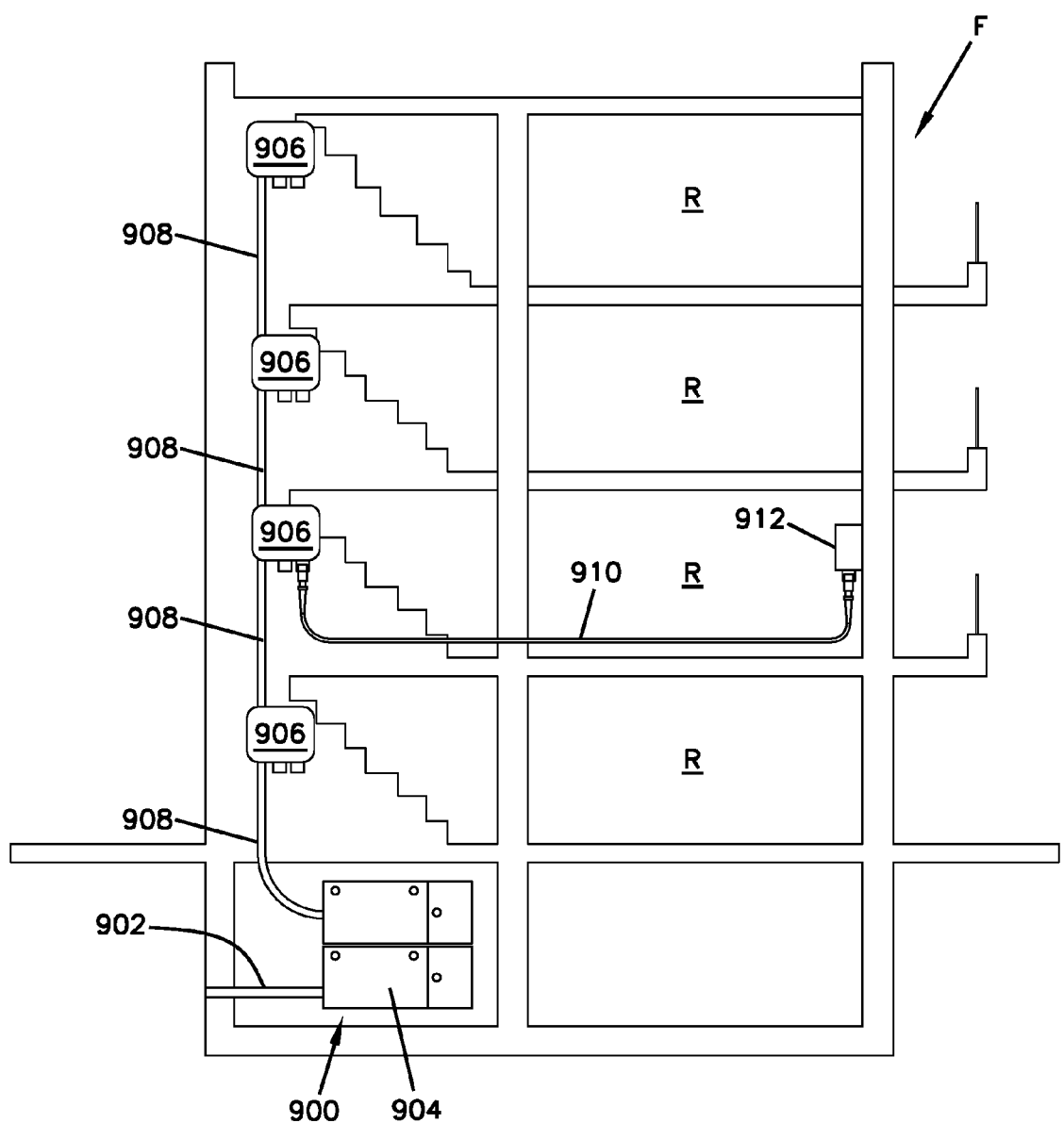
FIG. 1 is a schematic representation of a fiber optic network disposed in a facility.

FIG. 1 is a schematic representation of a fiber optic network 900 disposed in a facility F. In examples, the facility F includes multiple individual residences R (e.g., apartments, condominiums, businesses, etc.). In the example shown, the facility F includes five floors, including a basement, that each have one or more residences R located thereat. In other examples, the facility F can have a greater or lesser number of floors.

The fiber optic network 900 includes a feeder cable 902 from a central office (not shown). The feeder cable 902 enters a feeder cable input location 904 (e.g., a fiber distribution hub, a network interface device, etc.) disposed at the facility F (e.g., in the basement of the facility). The fiber distribution hub 104 has one or more optical splitters (e.g., 1-to-8 splitters, 1-to-16 splitters, or 1-to-32 splitters) that generate a number of individual fibers.

At least one fiber optic enclosure 906 is mounted at each floor of the facility F. In the example shown, a fiber optic enclosure 906 is mounted at each floor above the basement. The individual fibers generated by the optical splitters are routed to the fiber optic enclosures 906 via one or more riser cables 908. Examples of fiber optic enclosures 906 suitable for use in the fiber optic network 900 can be found in U.S. Publication No. 2013/0094828, the disclosure of which is hereby incorporated herein by reference.

Subscriber cables 910 are routed from the fiber optic enclosures 906 to respective residences R. The subscriber cable 910 includes an optical fiber disposed in a jacket or protective tubing. In some implementations, a subscriber cable 110 is routed to a transition box at the respective residence R. In other examples, a subscriber cable 910 is routed through the walls of the residence R (e.g., within ducts) towards a wall outlet 912.

FIG. 2 is a schematic representation of an example residence R including walls and a floor defining a room. A wall box 912 is disposed at a desirable location within the residence R for optical and/or optoelectronic equipment. In some implementations, the subscriber cable 910 extends through ducts in the wall and enters the residence R behind the wall outlet 912. In other implementations, the subscriber cable 910 enters the residence and extends over the wall to the wall outlet 912. In certain implementations, the subscriber cable 910 can be routed through the room by adhesively affixing the subscriber cable 910 to the walls, floor, ceiling, and/or moldings within the room.

The wall box 912 serves as a demarcation point within the residence R for the optical service provider. The subscriber cable 910 is optically coupled to an optical connector at the wall outlet 912. Accordingly, optical signals carried by the subscriber cable 910 are available at the optical connector.

In some implementations, the optical connector terminates the subscriber cable 910. In some examples, the end of the subscriber cable 910 can be fully connectorized with optical connector so that the end can be plugged into a corresponding port at the wall outlet 912. The terminated end can be factory installed and factory inspected prior to installation in the field. In other examples, the subscriber cable 910 can have a partially terminated end that is fully connectorized as optical connector in the field and plugged into a port at the wall outlet 912. Partially terminated ends can be advantageously routed through small ducts to facilitate passage through walls of the residence R. The partially terminated end can be quickly installed in the field without tools, such as an optical fusion splicer.

In other implementations, the optical connector terminates a pigtail that is optically coupled to the subscriber cable 910. In an example, the pigtail is spliced (e.g., fusion spliced or mechanically spliced) to an unterminated end of the subscriber cable 910. Unterminated ends can be advantageously routed through small ducts to facilitate passage through walls of the residence R. In another example, another connectorized end of the pigtail is connected to a connectorized end of the subscriber cable 910 at an adapter disposed at the wall outlet 912.

Optical Network Terminal (ONT) with Cable Storage

A user can choose to connect an optical network terminal (ONT) 914 or other equipment to the connector of the wall outlet 912 to connect the ONT 914 or other equipment to the fiber optic network 900. In some examples, the ONT 914 is provided with a packaged cable dispenser 900 having a patch cord or jumper cable 102 that can extend between the ONT 914 and the wall outlet 912. The ONT 914 also can have a power cord 918 that plugs into an electrical outlet 911 to provide power to the ONT 914.

Figure 3A:
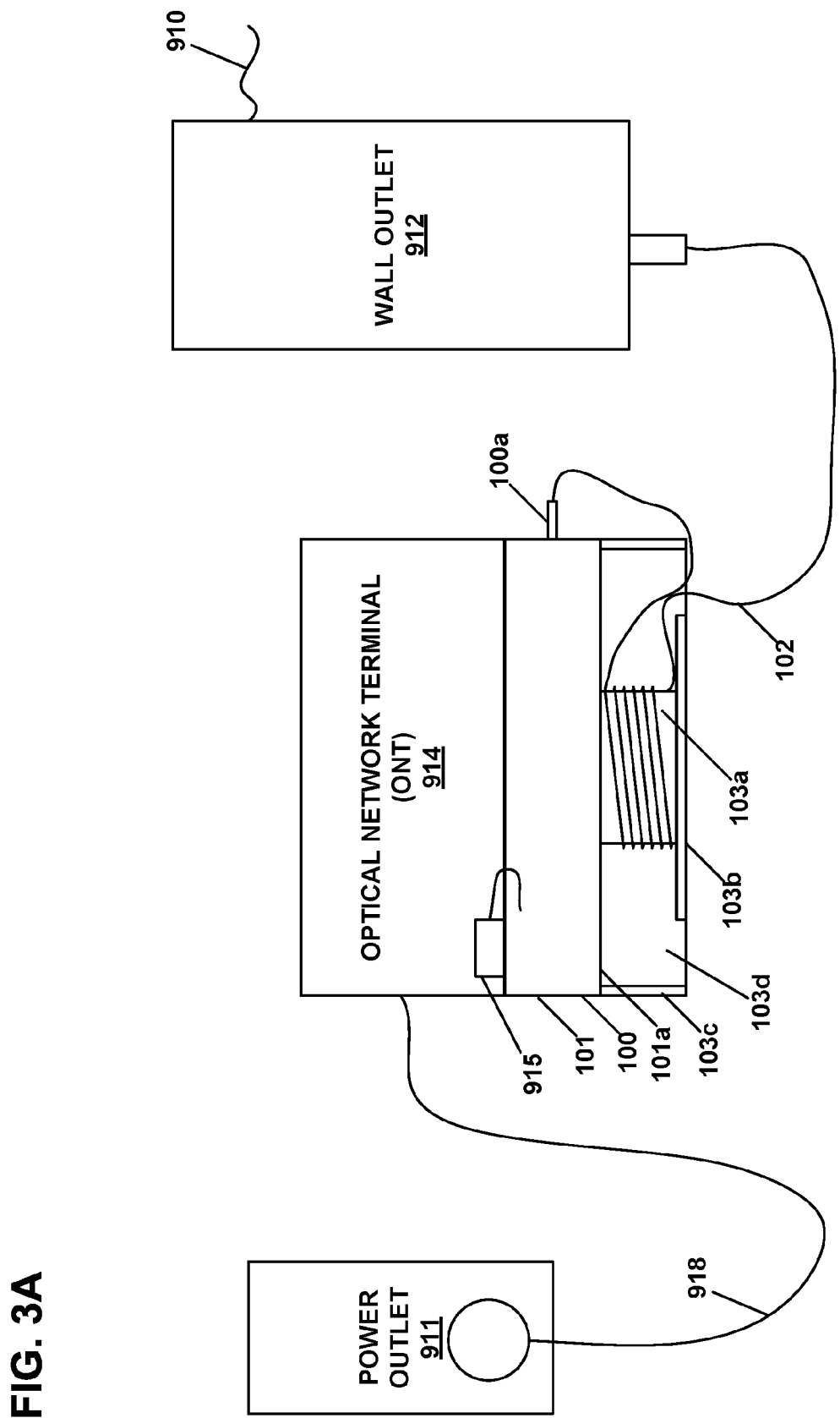
FIG. 3A is a schematic representation of the ONT shown in FIG. 2 in a first configuration having exemplary features of aspects in accordance with the principles of the present disclosure.
Figure 3B:
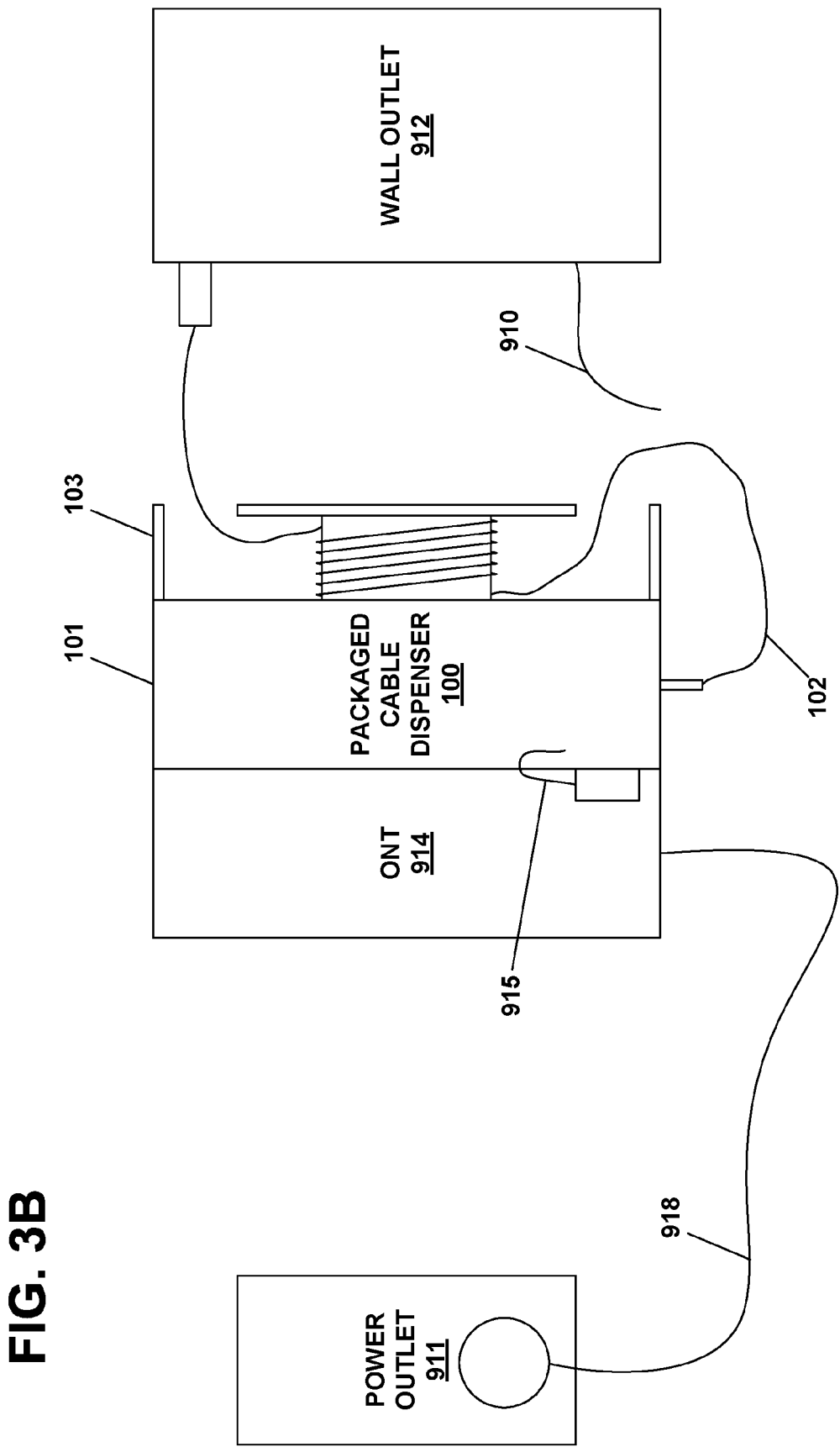
FIG. 3B is a schematic representation of the ONT shown in FIG. 2 in a second configuration having exemplary features of aspects in accordance with the principles of the present disclosure.
Figure 3C:
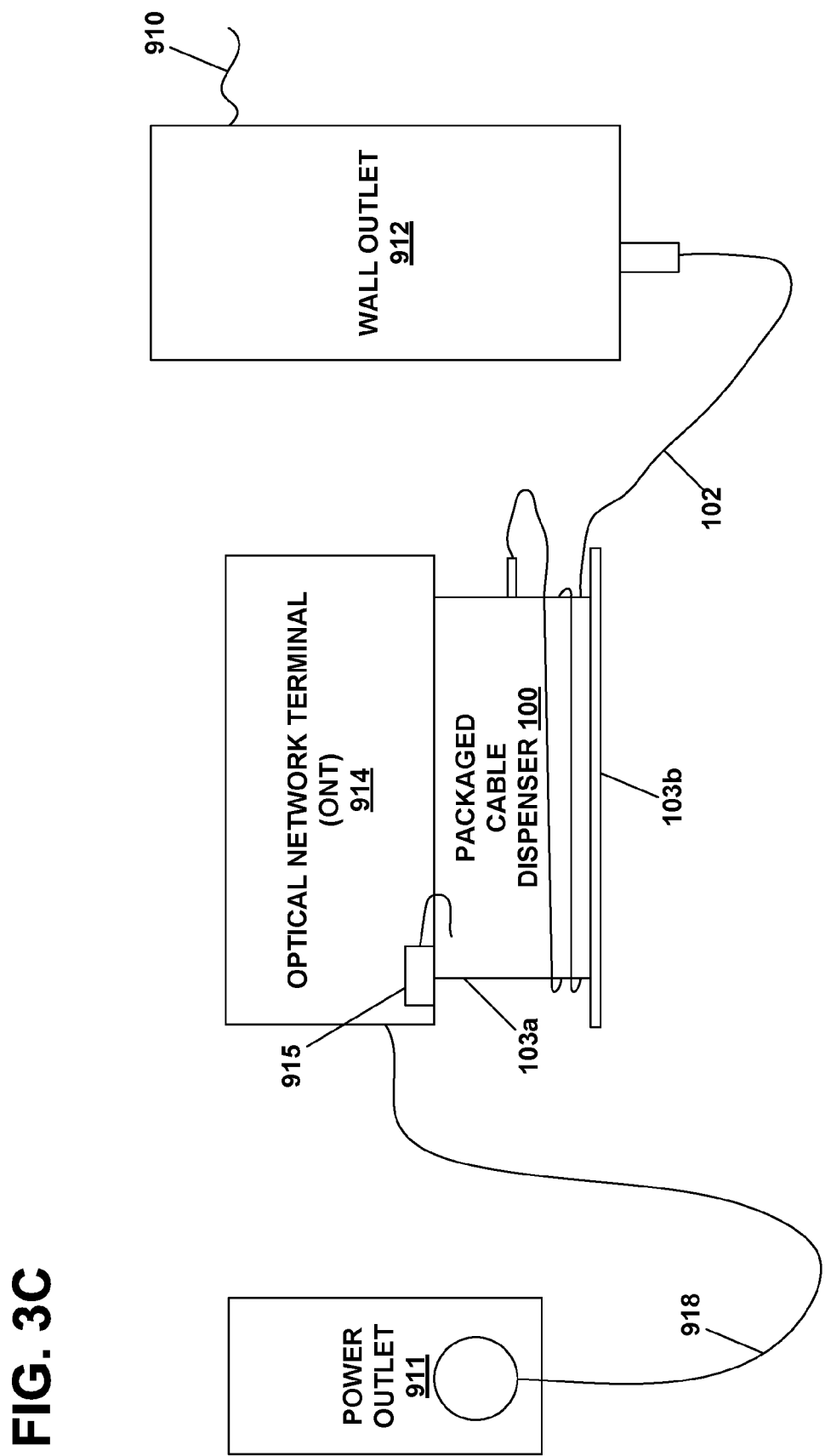
FIG. 3C is a schematic representation of the ONT shown in FIG. 2 in a third configuration having exemplary features of aspects in accordance with the principles of the present disclosure.

Referring to FIGS. 3A, 3B, and 3C, various embodiments are shown of an ONT 914 to which a packaged cable dispenser 100 is mounted. The dispenser 100 can be mounted by various means, such as by a snap-fit connection, a plug and socket type connection, and/or by mechanical fasteners. By providing a packaged cable dispenser 100 on the ONT 914, an installer can readily connect the ONT 914 to the wall outlet 912 with the cable 102 without having to separately provide the cable or other hardware.

As described in detail in the following section, the packaged cable dispenser 100 is configured as a coreless wound coil. In such a configuration, the cable 102 can be withdrawn through an outlet opening 103 without requiring any moving parts within the dispenser and without requiring that the cable 102 be radially unwound about a core. Accordingly, the dispenser 100 can be mounted to the ONT 914 and the cable 102 can be withdrawn from the dispenser 100 without relative motion between the ONT 914 and the dispenser 100.

As shown, the cable 102 is connected to a connector/adapter 915 of the ONT 914. In one example, the cable 102 is pre-connectorized such that the cable 102 can be easily connected to the connector 914 before or after the dispenser 100 has been mounted to the ONT 914. Similarly, the end of the cable 102 that is attached to the wall outlet 912 can also be pre-connectorized such that the cable 102 can be easily connected to the wall outlet 912.

In one aspect, the packaged cable dispenser 100 has a wound section 101, in which the coreless wound coil is stored, and an excess cable storage section 103, in which cable 102 that has been removed from the wound section can be wound to take up any excess slack. As shown, sections 101 and 103 are provided within the same package such that the dispenser 100 appear to be a unitary structure, although they are separated by a common wall 101a. Once cable 102 is withdrawn from the coreless wound coil through outlet 100a, the cable 102 cannot be re-fed back into outlet 100a such that the cable 102 will be appropriately re-wound. As such, the excess cable storage section 103 provides a storage location for cable 102 that has been withdrawn from outlet 100a but may not have actually been needed to reach the wall outlet 912 or another component.

As shown, the excess cable storage section 103 can be provided with a spool 103a and a flange 103b. The cable 102 can be wound about the spool 103a and the flange 103b acts to retain the cable 102 so as to not slide off of the spool 103a. The cable storage section 103 can also be provided with package sidewalls 103c so as to partially conceal the storage area. Together, the sidewalls 103c and the flange 103b define an opening 103d through which the cable 102 can be inserted and wound about the spool 103a. The flange 103c can be provided in many forms, such as a solid disk. With reference to FIG. 4, the flange 103b is provided as multiple extensions 103e extending radially from the end of the spool 103a.

With respect to FIG. 3A, an example is shown in which the dispenser 100 is configured in a bottom mount configuration in which the excess storage section 103 is located below the ONT 914. With respect to FIG. 3B, an example is shown in which the dispenser 100 is configured in a side mount configuration in which the excess storage section 103 is located to the side of the ONT 914. The excess cable storage section 103 can also be located above the ONT 914. FIG. 3C shows an example in which the excess cable storage section 103 is defined by the outer portion of the dispenser 100 instead of being in a side-by-side relationship.

Packaged Cable Dispenser Examples

Referring to FIGS. 6-44, exemplary cable storage arrangements 200, 300, 400, 500 are shown. Any of the disclosed cable storage arrangements 200, 300, 400, 500 can be utilized with the systems shown and described above. Examples of suitable cable storage arrangements are also shown and described in U.S. Patent Application Ser. No. 62/094,656, filed on Dec. 19, 2014, the entirety of which is incorporated by reference.

Figure 6:
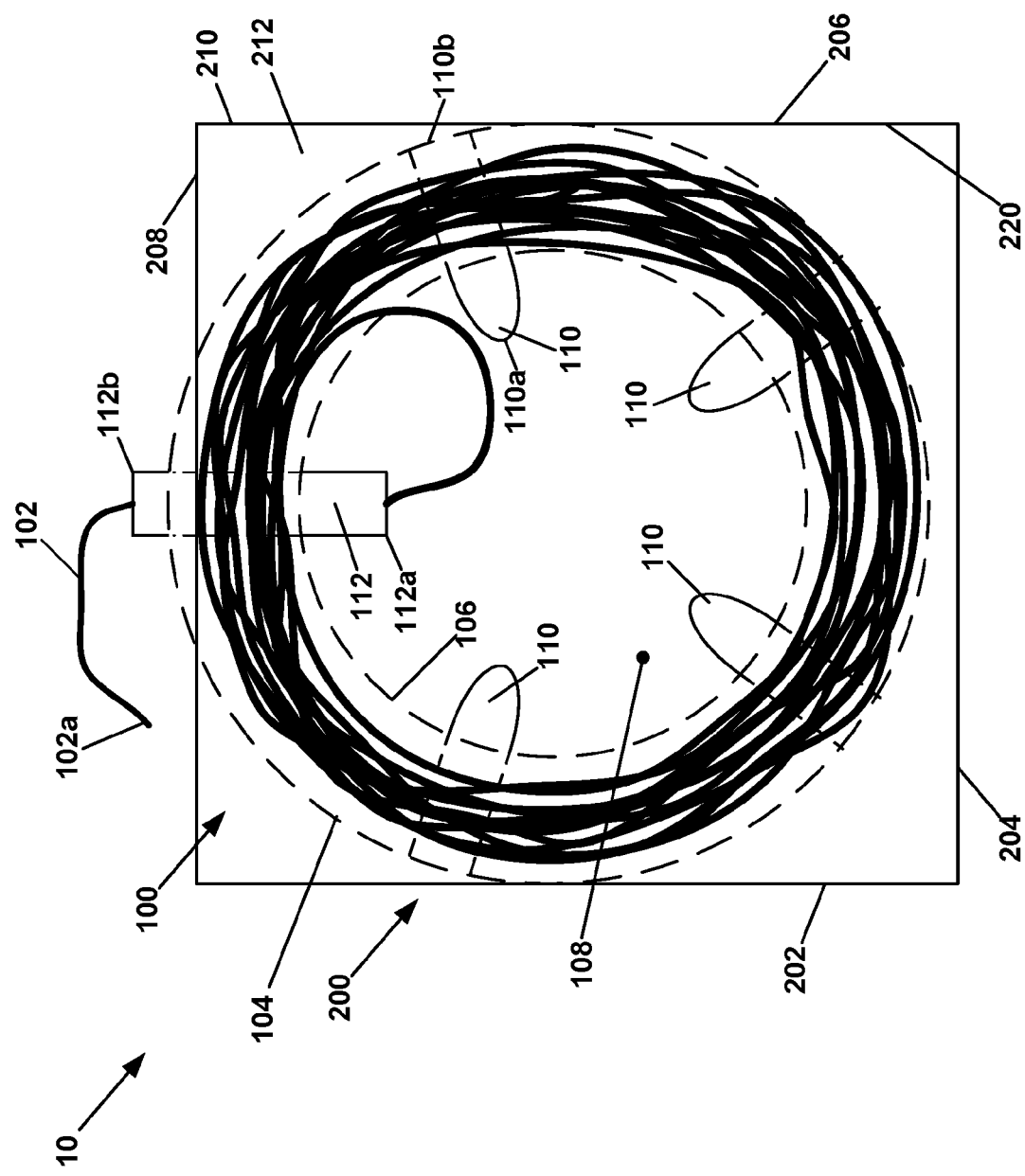
FIG. 6 is a schematic top view of a first embodiment of a packaged cable dispenser including a coreless wound coil disposed in a package having exemplary features of aspects in accordance with the principles of the present disclosure.

Referring to FIG. 6, a first embodiment of a packaged cable dispenser 10 is disclosed. FIG. 1A also shows a generally similar packaged cable dispenser 10, but with a different packaging. As shown, the dispenser 10 can have a coreless wound coil 100 disposed in a package 200. In one aspect, the coreless wound coil 100 includes a length of telecommunications cable 102 wound to define an exterior winding surface 104 and an interior winding surface 106 which further defines a hollow interior 108. In one example, the wound coil 100 has an outside diameter equal to or less than about 5 inches, and preferably about 3 inches to about 3½ inches. In one example, the telecommunications cable 102 is a fiber optic cable. Because the disclosed teachings provide for the formation of a wound coil of fiber optic material that is coreless, the total length of cable 102 that can be wound into a single coil can be greater than what is obtainable for fiber optic cables wound about a core structure. This is due to the circumstances that cumulative hoop stresses exerted by the cable itself on more interior wound loops near the core structure limit the total length of the cable. As such forces are essentially entirely absent in a coreless wound coil, once removed from the mandrel about which it is formed, the disclosed teachings represent a significant improvement.

In one example, the cable 102 has a factory ferrulized end, such as is described in Patent Cooperation Treaty (PCT) patent application publication WO 2014/085459, the entirety of which is hereby incorporated by reference. In such a case, optical connectors can be later mounted to the ferrulized end of the cable 102, as explained in the WO '459 publication and as explained in United States patent application publication US 2014/0153878 A1, the entirety of which is hereby incorporated by reference. One or both ends of the cable 102 can also be connectorized as explained in U.S. Pat. No. 8,439,577, the entirety of which is hereby incorporated by reference. It is also noted that since the non-pulled end of the cable 102 can be pre-connectorized within the package 200, as the wound coil 100 does not rotate within the package 200 during dispensation.

In one example, the telecommunications cable 102 has a nominal diameter of less than 3 millimeters (mm), a diameter of less than 2 mm, and/or a diameter of less than 1 mm. In one example, the cable 102 has a nominal diameter from about 800 to about 900 microns and includes a plurality of individual optical fibers of about 250 microns. In one example, the telecommunications cable 102 has a pull rating sufficient to allow the cable 102 to be pulled through a conduit without damaging the fibers, for example a pull rating of about 300 Newtons. In one example, the telecommunications cable 102 is provided with sufficient stiffness to allow the cable 102 to be pushed through a conduit, for example the cable 102 can be provided with stiffening aramid fibers or steel wire.

Figure 6A:
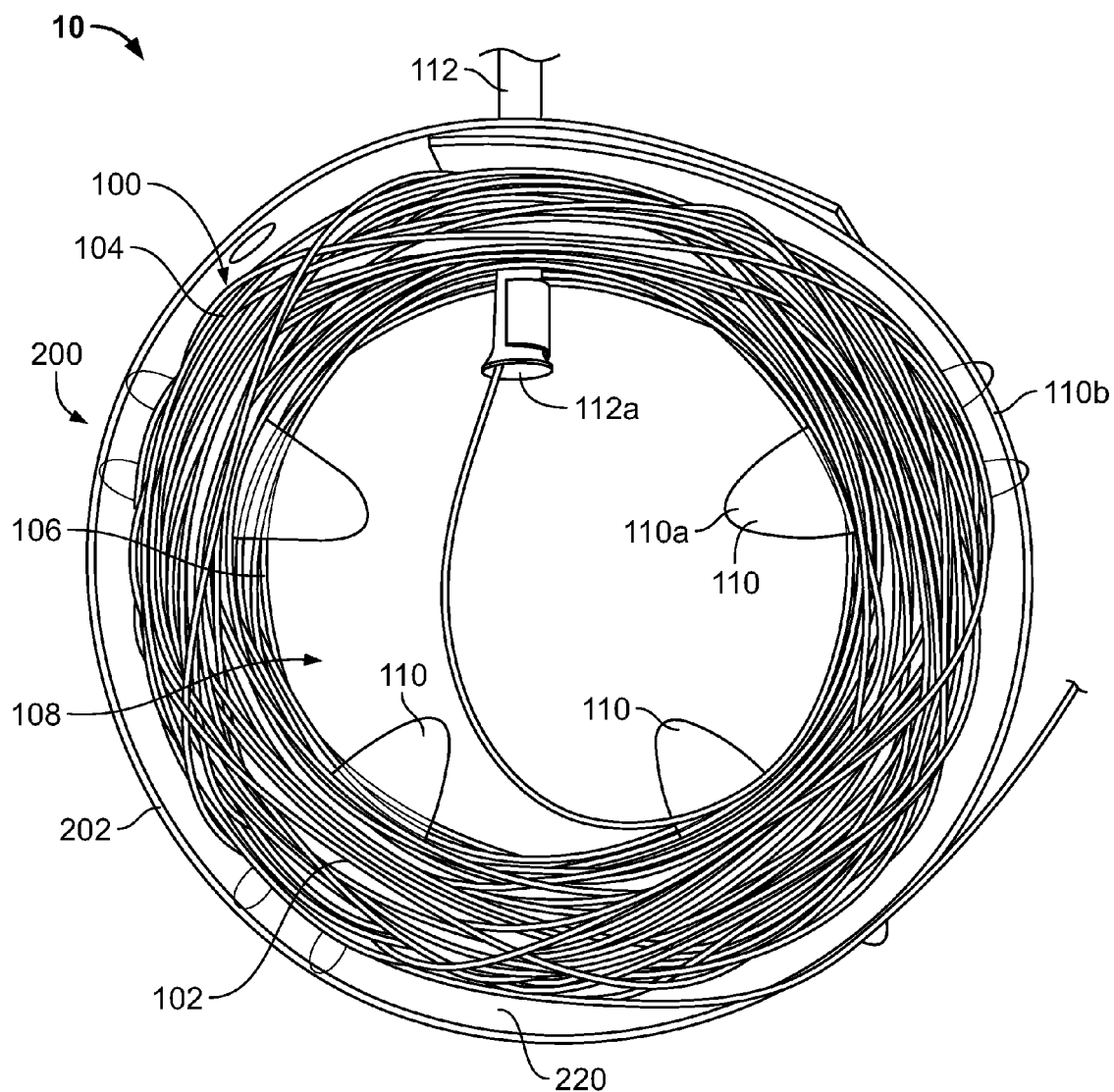
FIG. 6A is a perspective view of a packaged cable dispenser similar to that shown in FIG. 6, but with a round package.

In another aspect, the package 200 can include interconnected sidewalls 202, 204, 206, 208 extending between a top side 210 and a bottom side 212. The sidewalls 202, 204, 206, 208 can define an interior perimeter 220. As shown, the exterior winding surface 104 of the wound coil 100 is within the interior perimeter 220 of the package 200. The package 200 may be formed from a variety of materials, such as plastic or a paper product. The package 200 may be provided with a closable opening for inserting the wound coil 100 within the package 200. Referring to FIG. 6A, the dispenser 10 is provided with a circular sidewall 202, in contrast to the square packaging shown in FIG. 6.

In the exemplary embodiment shown, the wound coil 100 further includes a plurality of winding separators 110, 112 embedded within the wound coil 100. The winding separators 110, 112 function to create and maintain the winding pattern of the wound coil 100 by preventing migration of the cable 102 across the width of the wound coil 100. In one example, the winding separators 110, 112 are provided with a curved or rounded profile to reduce friction between the cable 102 and the separators 110, 112 as the cable 102 is being unwound from the interior winding surface 106. As shown, each of the winding separators 110, 112 extends completely through the wound coil 100. To achieve this function, the winding separators 110, 112 can be provided with a respective first end 110a, 112a extending at least to the interior winding surface 106 and a second end 110b, 112b extending at least to the exterior winding surface 104. Each of the winding separators 110, 112 may also be provided with a respective first side 110c, 112c and a respective opposite second side 110d, 112d.

Figure 6B:
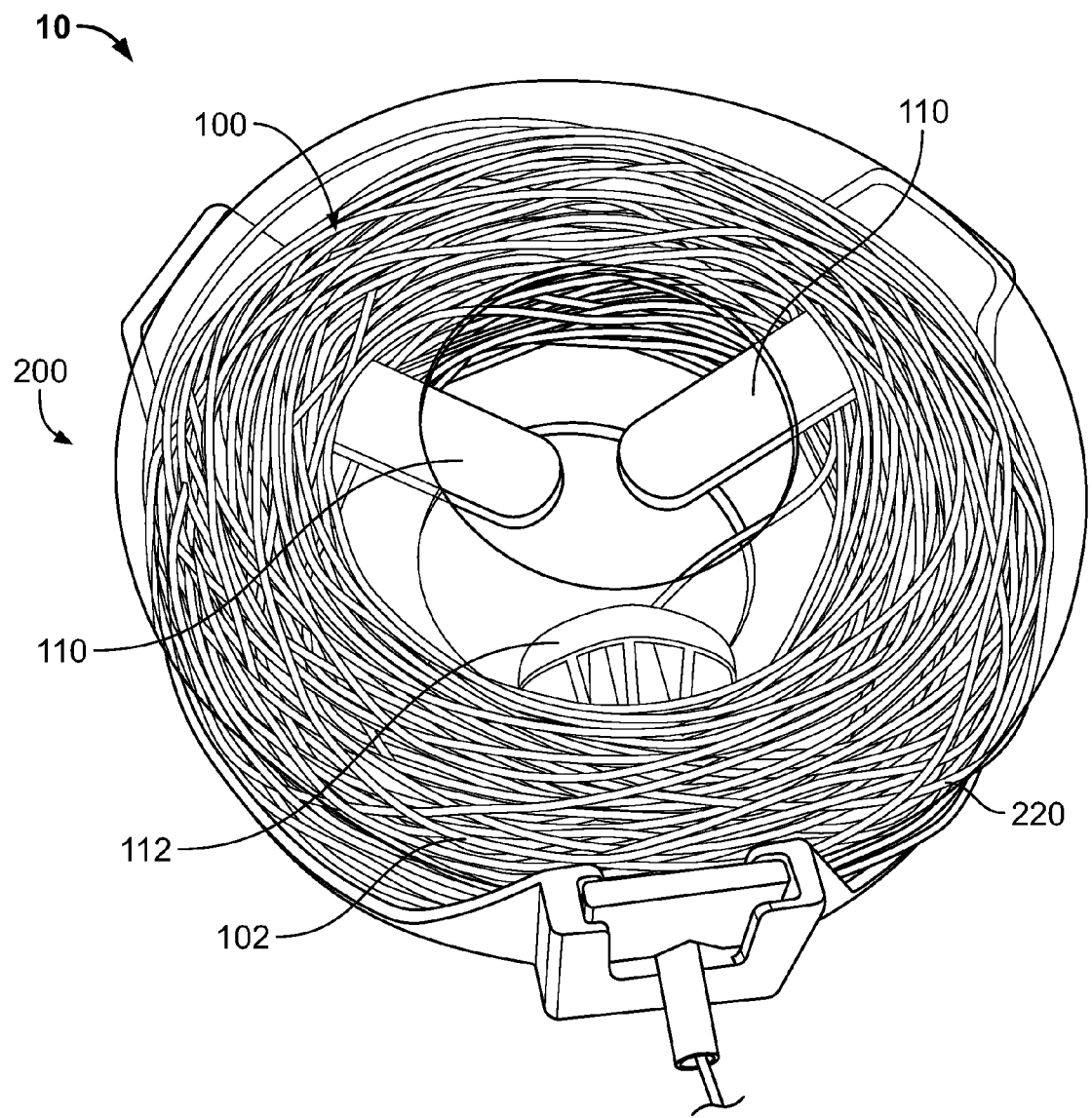
FIG. 6B is a perspective view of a packaged cable dispenser similar to that shown in FIG. 6, but with fewer winding separators.
Figure 7:
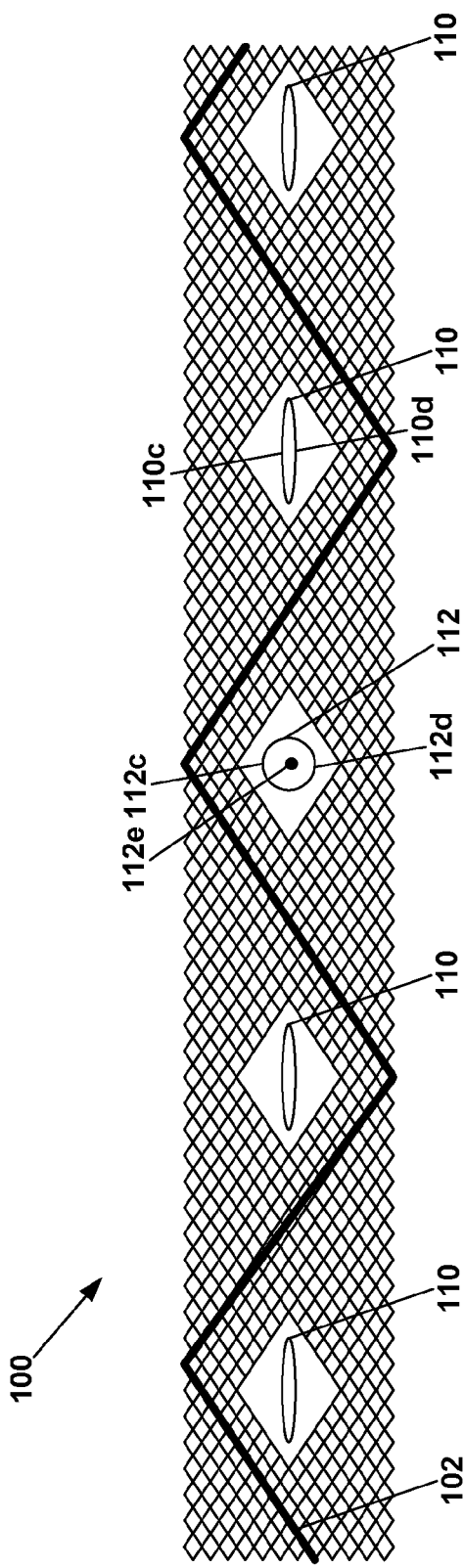
FIG. 7 is a schematic top view of a flat layout of the coreless wound coil shown in FIG. 6.

With reference to FIG. 7, a flat layout schematic is presented of the wound coil 100 shown in FIG. 6 to illustrate the winding pattern of the coil 100 with respect to the winding separators 110, 112. As shown in FIG. 7, a plurality of wraps of the cable 102 are illustrated with a single wrap 102 being shown in bold for the purpose of discussion herein. During each wrap or pass of the winding process, the cable 102 is woven between the separators 110, 112 such that the cable 102 alternately passes on one of the first and second sides 110c, 112c, 110d, 112d of one winding separator 110, 112 and on the other of the first and second sides 110c, 112c, 110d, 112d of an adjacent winding separator 110, 112. Accordingly, for the embodiment shown in which five winding separators 110, 112 are provided, the cable 102 passes on the first side 110c of the first separator 110, then on the second side 110d of the next separator 110, then on the first side 110c of the next separator 110 (or 112d of separator 112), then on the second side 110d of the next separator 110, then on the first side 110c of the last separator 110. As the winding process is continuous, the cable 102 will then pass on the second side 110d of the first separator 110 and the cable 102 will continue to be woven on the opposite sides of the separators 110, 112 than the previous winding pass of the cable 102. As long as the total number of winding separators 110, 112 is an odd number, the cable 102 will wind on opposite sides of the separators with each alternating winding wrap. Such an approach which will ensure that half of the cable 102 in the fully wound coil 100 is wound onto each side of the separators 110, 112 in a balanced manner with the cable 102 crossing over the previously wound segment between each winding separator 110, 112 to prevent cable twist during removal of the cable 102. Although five winding separators 110, 112 are shown, it should be understood that more or fewer winding separators 110, 112 may be utilized, for example, three, seven, nine, and/or eleven winding separators 110, 112. In one example, and as presented in FIG. 6B, a packaged cable dispenser 10 having three winding separators, including a payout tube 112 and two separators 110, is shown. It is noted that the use of fewer separators 110, 112 will result in fewer cable cross-overs for each wound loop and a lower density winding, which can be beneficial for accommodating cables of larger diameters.

In the embodiment shown, winding separator 112 is shown as being formed as a hollow payout tube 112 having a hollow interior 112e and extending through the sidewall 202 of the package. As configured, the starting end 102a of the cable 102 is pulled from the interior winding surface 106 of the wound coil and through the interior 112e of the payout tube 112. Accordingly, the cable 102 can be pulled from the package through the payout tube 112 such that the wound coil is paid out from the interior winding surface 106 towards the exterior winding surface 104. As the cable 102 has been wound in the above manner, the cable 102 can be pulled from the wound coil 100 without a twist being imparted onto the cable 102. In one aspect, the hollow interior 112e has an interior dimension that is large enough to not unduly restrict the cable 102 as it is being pulled, but not so large that a potentially kinked or knotted cable 102 could enter into the interior 112e. In one example, the hollow interior 112e is no greater than twice the diameter of the cable 102.

Figure 8:
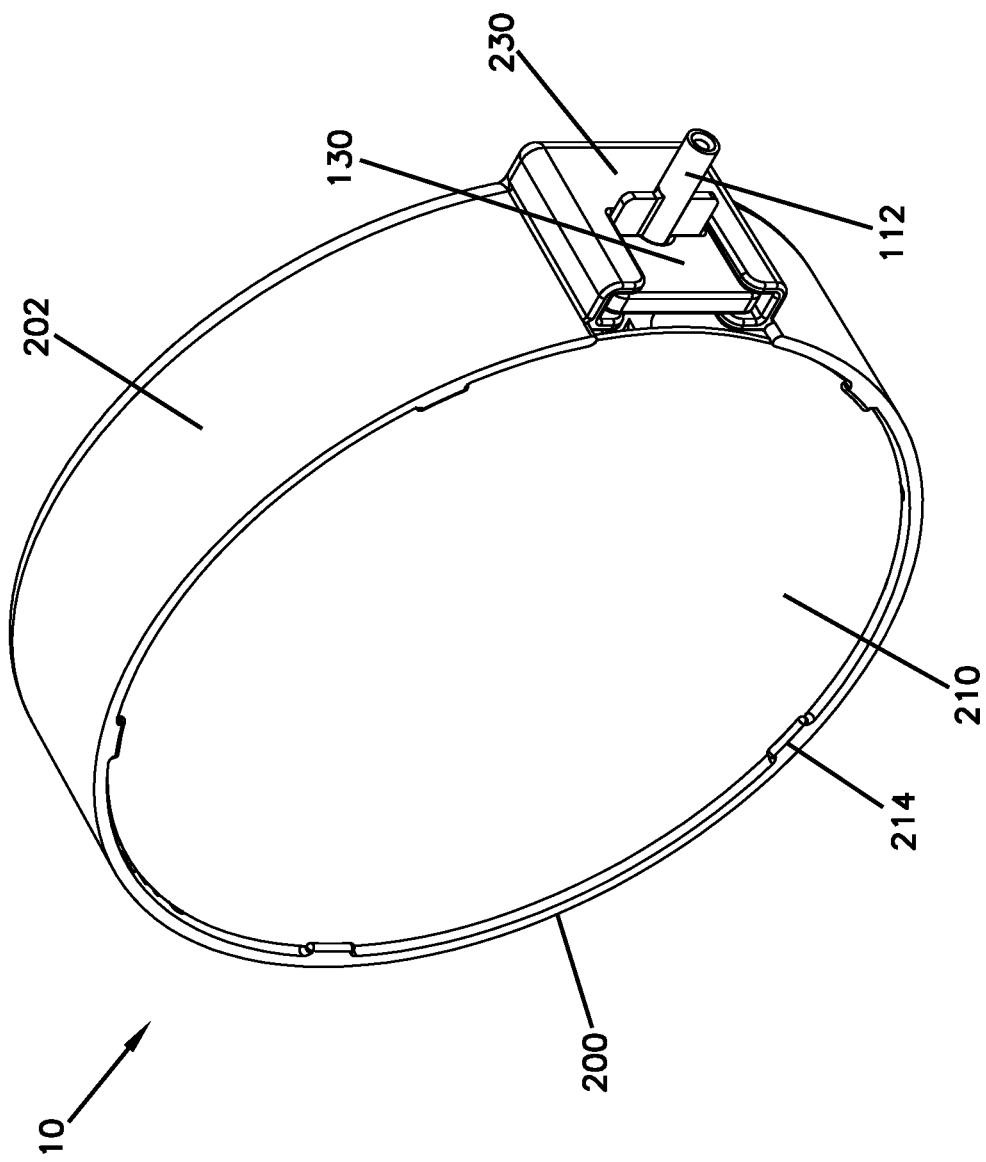
FIG. 8 is a perspective view of a physical example of the packaged cable dispenser of FIG. 6.
Figure 10:
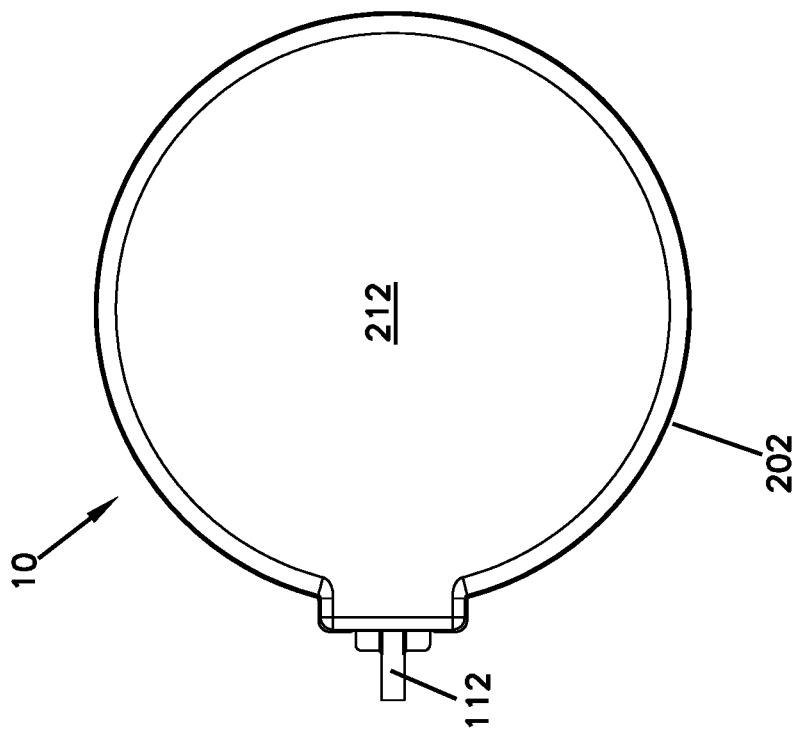
FIG. 10 is a bottom view of the packaged cable dispenser of FIG. 9.
Figure 9:
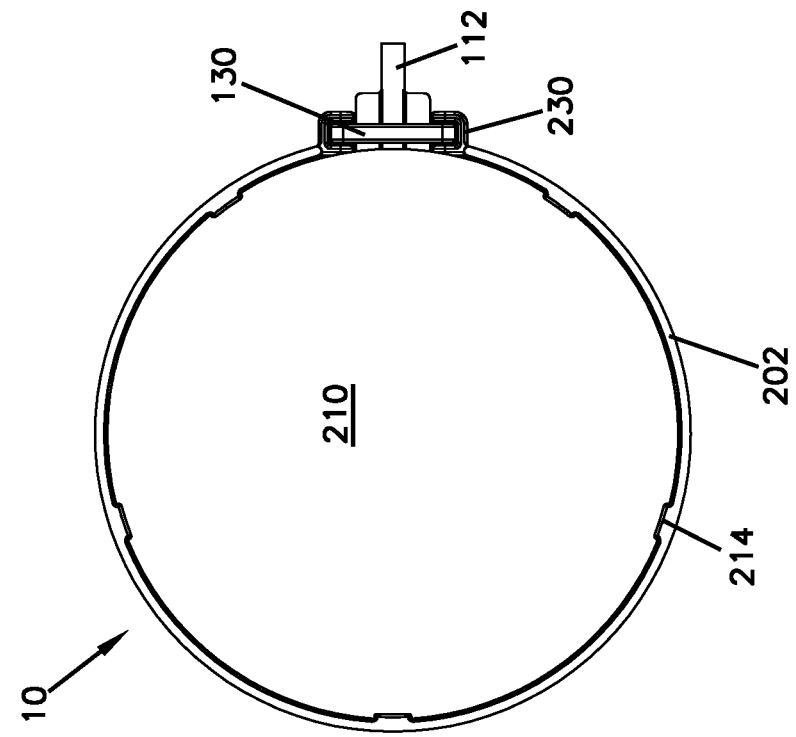
FIG. 9 is a top view of the packaged cable dispenser of FIG. 8.

Referring to FIGS. 9-24, a physical example of the packaged cable dispenser 10 schematically shown at FIGS. 6-8 is presented. As shown, package 200 is configured as a generally cylindrical-shaped housing 200. However, it should be appreciated that numerous housing shapes are useful with the disclosed teachings, for example, housings that have any of a number of geometric shapes (e.g. ovular, triangular, square, rectangular, pentagonal, hexagonal, octagonal, etc.). As shown, housing 200 has a continuous sidewall 202 defining the interior perimeter 220. The housing 200 is also provided with a bottom wall 212 adjoining the sidewall 202. As shown, the bottom wall 212 and the sidewall 202 are integrally formed as a single component. However, the bottom wall 212 could be formed as a separate component which is either permanently or removably joined to the sidewall 202. The housing 200 can also be provided with a top wall 210. As shown, the top wall 210 is removably attached to the sidewall 202, but could also be permanently attached, if desired. The top wall 210 can be secured to the sidewall 202 by tabs 214 provided on the sidewall 202 and by the first ends or top edges 216b of mounting or channel members 216 (discussed later) provided on the sidewall 202. In one aspect, the top wall 210 is connected to the sidewall 202 with a snap-fit type of connection. Together, the sidewall 202, the top wall 210, and the bottom wall 212 form an interior volume 214 within which the coreless wound coil 100 can be stored.

In one aspect, the winding separators 110 can be provided with a first end 110a, a second end 110b, a first side 110c, and a second side 110d. In the example shown at FIGS. 9-24, each of the winding separators 110 can be provided with a stem portion 114 extending from a base portion 116. The stem portion 114 is shown as extending between the first and second ends 110a and having the base portion 116 attached at the second end. As shown, the stem portion 114 and the base portion 116 are integrally formed as a single component, but may be formed as separate components that are later joined together.

The stem portion 114 of the winding separator 110 is flared at the first end 110a such that the first end 110a has a thickness t1 that is greater than a thickness t2 of the stem portion 114 at the second end 110. The flared first end 110a operates to retain the cable 102 onto the winding separators 110 such that the cable 102 does not prematurely unravel with only one loop coming off the separator 110 at a time. In one aspect, the flared first end 110a can be provided with sloped portions 110e transitioning between the first and second thicknesses t1, t2. The sloped portions 110e, 110f can be configured to gently guide the cable 102 past the first end 110a while also preventing the cable 102 from becoming hung up or caught on the first end 110a. Each winding separator 110 may also be provided with rounded portions 110f that provide rounded transitions between the first and second sides 110c, 110d. As the cable 102 is passing from one side 110c, 110b of one separator 110 to the other side 100c, 110d of the adjacent separator 110, the rounded portions 110f help to ensure that the cable is gently guided along the pathway and is not exposed to any sharp edges. In one aspect, the separators 110 are hollow or partially hollow at the first end 110a in order to form the sloped portions 110e and the rounded portions 110f. However, the winding separator 110 can be provided as an entirely solid structure without departing from the concepts presented herein.

As shown, the base portion 116 of each winding separator 110 can be defined as having a top side 116a and a bottom side 116b extending between opposite sides 116c,d and between opposite sides 116e,f. In the example shown, the base portion 116 is provided with a generally rectangular shape, although other shapes are possible. During the winding process, the base portion 116 enables a greater amount of cable 102 to be wound into a coil 100 in comparison to a winding separator 110 not having a base portion 116. The top side 116a of the base portion 116 provides a positive surface against which the cable 102 can be wound and retained thereby allowing cable 102 to be wound all the way to the second end 110b of the winding separator. Where no base portion 116 is provided, the winding process must be stopped at a point such that at least a portion of the second end 110b of the winding separators 110 remains exposed such that the cable 102 cannot unintentionally unwind beyond the separator 110.

The base portion 116 also provides a mounting location for the wound coil 100 to be mounted within the housing 200. As stated previously, the housing 200 is provided with a plurality of channel members 216 at the sidewall 202. In one configuration, the each of the channel members 216 extends between a first end 216a adjacent the bottom wall 212 towards a second end 216b adjacent the top wall 210. In one aspect, the second end 216b is recessed from the top edge 202a of the sidewall 202 to accommodate the thickness of the top wall 210. The channel members 216 may be each provided with a first side member 216c and a second side member 216d that extend between the first and second ends 216a, 216b. Together, the side members 216c,d and the sidewall 202 define a channel that receives and retains the base portion 116 of a winding separator 110. As configured, the wound coil 100 can be formed on a winding apparatus and then mounted within the housing 200 by aligning and then sliding the base members 116 of each winding separator 110 into the corresponding channel member 216. Although the use of base members 116 and channel members 216 are a useful configuration for providing a connection between the wound coil 100 and the housing 200, it should be appreciated that other cooperating structures may be used without departing from the concepts described herein.

A payout tube 112, which also functions as a winding separator, is also provided in the packaged cable dispenser 10 shown in FIGS. 11-29. In one aspect, the payout tube 112 has a first end 112a, a second end 112b, a first side 112c, and a second side 112d. The payout tube 112 can also be configured with a stem portion 118, a head portion 120, side flanges 122 and buttresses 124. In the example shown, the payout tube is a single molded component. In combination, the head portion 120 and the stem portion 118 define the hollow interior 112e through which the cable 102 can extend from the interior of the wound coil 100 to the exterior of the housing 200. As shown, the side flanges 122 are provided to define the first and second sides 112c, 112d and enable the payout tube 112 to function as a winding separator in the same manner as the winding separators 110. The side flanges 122 are also provided with sloped regions 122a that gently slope to the head portion 120 and allow a segment of unwinding cable 102 to be guided up to the head portion 120 without excessive bending or catching of the cable 102 on the head portion 120. As shown, the buttresses 124 extend from the side flanges and the stem portion 118 on the first and second sides 112c, 112d towards the head portion 120. In one aspect, the buttresses 124 provide a transition from the sides 112c, 112d and stem portion 118 to gently guide the cable 102 up to the head portion 120 while also preventing the cable 102 from becoming hung up or caught on the head portion 120.

The head portion 120 is also shaped to prevent the cable 102 from becoming bent too sharply or kinked as the cable 102 is being pulled through the payout tube 112 and passing by one side 112c, 112d of the payout tube 112. The head portion 120 can be described as having a rounded outer surface 120c for guiding the cable 102 about the payout tube 112 as the cable 102 passes by the payout tube 112. The head portion 120 can also be described as having a funneling surface 120d that smoothly guides the cable into the hollow interior 112e. In one example, the head portion 120 is provided as a toroidal shape having two axes of symmetry. For example, and as most easily viewed at FIG. 24, the head portion 120 is symmetrical about an axis X and symmetrical about an axis Y. In one aspect, the head portion 120 is elongated along the X axis relative to the Y axis to create a rounded diamond-shape with a leading edge 120a and a trailing edge 120b. The rounded leading edge 120a aids in guiding the cable 102 to the appropriate side 112c, 112d of the payout tube 112 as the cable 102 is unwinding off of the winding adjacent winding separators 110 which prevents kinking or tangling of the cable 102. The outer surface 120c and the funneling surface 120d also function as a bend radius limiter for the cable 102. In one aspect, the outer surface 120c and funneling surface 120d can be configured to define a radius of about ¼ inch to about ½ inch.

In one aspect, the payout tube 112 can be secured to the housing with a clip member 130 that inserts into a corresponding receptacle 230 provided at a notch 232 in the sidewall 202. As shown, the clip member 130 is formed as a plate having an aperture 132 having a profile that matches at least a portion of the payout tube 112. In the example shown, the aperture 132 is shaped to allow the stem portion 118 and the side flanges 122 to be inserted through the clip member 130. As shown, the clip member 130 is formed as a separate component that can be mounted and secured onto the payout tube 112 either before or after the cable 102 has been wound to form the wound coil 100. Alternatively, the clip member 130 can be formed integrally with the rest of the payout tube 112. As the payout tube 112 is slidable relative to the clip member 130, the position of the payout tube 112 can be adjustable relative to the housing 200 to optimize the location of the head portion 120 with respect to the interior of the wound coil 100. Such adjustability would allow for the same constituent parts to be used in multiple applications where differing cable dimensions and properties and/or wound coil diameters may be associated with different optimal locations for the head portion 120 within the housing 200. In one embodiment, index positions can be provided on the clip member 130 and/or the payout tube 112 such that the desired position of the payout tube with respect to the housing 200 can be readily achieved during assembly. This general construction is also advantageous in that different payout tubes 112 having different lengths and head styles may be used with the same housing 200.

Figure 26:
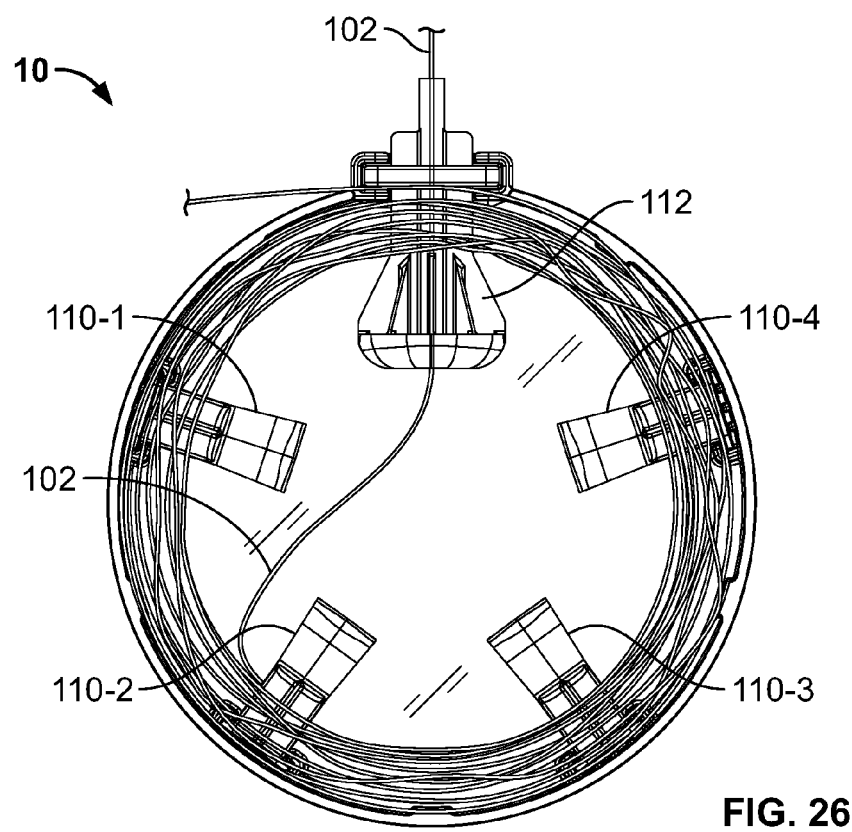
FIG. 26 is a perspective view of the packaged cable dispenser of FIG. 9 while dispensing cable in a second state.
Figure 27:
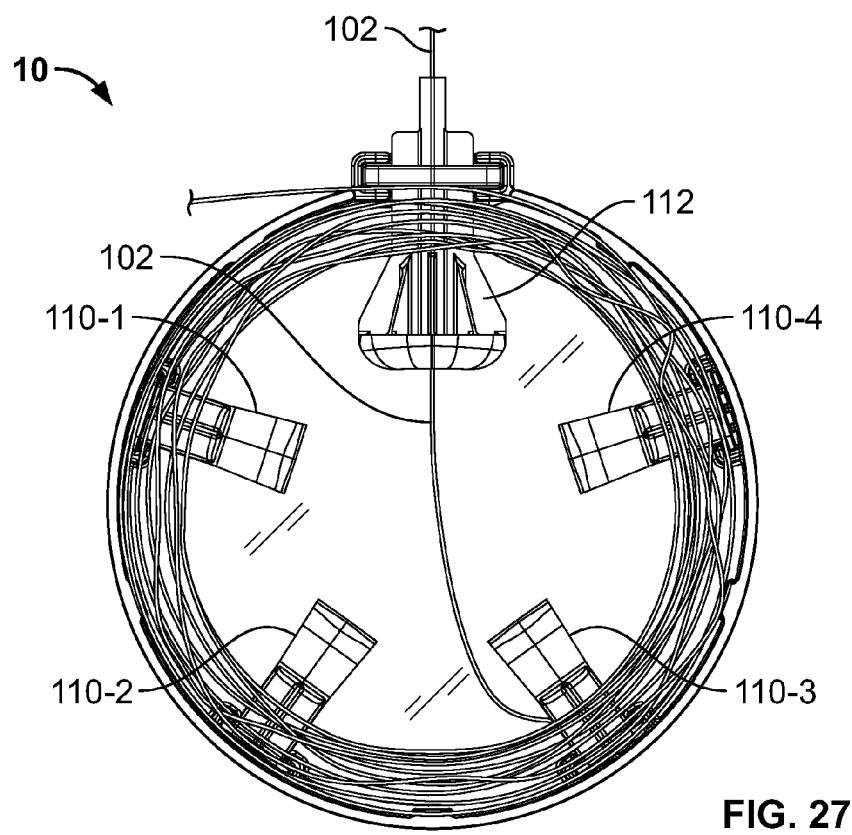
FIG. 27 is a perspective view of the packaged cable dispenser of FIG. 9 while dispensing cable in a third state.
Figure 28:
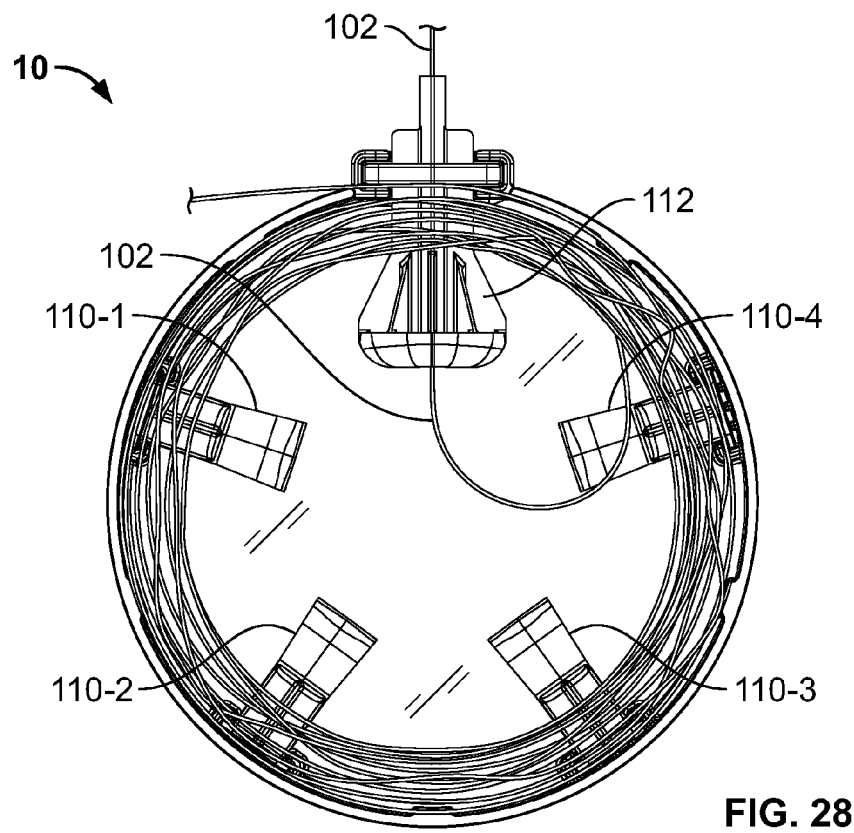
FIG. 28 is a perspective view of the packaged cable dispenser of FIG. 9 while dispensing cable in a fourth state.

Referring to FIGS. 25-33, depictions of a cable 102 being dispensed from a dispenser 10 having a clear package 200 at different stages are shown in which the above described features of the winding separators 110 and payout tube 112 are illustrated. In FIG. 20, the cable 102 has just been unwound past the payout tube 112 second side 112*d* and is maintained on the first side 110*c* of the adjacent winding separator 110-1 by the flared first end 110*a* of the winding separator 110-1. FIG. 26 shows the cable 102 having been pulled further through the payout tube 112 such that the cable 102 has lifted off of the winding separator 110-1 but is still retained on the second side 110*d* of the next winding separator 110-2 by the flared first end 110*a*. Similarly, FIG. 27 shows the cable 102 now having been lifted off of the winding separator 110-2 while still being maintained on the first side 110*c* of the adjacent winding separator 110-3 by the flared first end 110*a* of the winding separator 110-3. FIG. 28 shows the cable 102 having been pulled further through the payout tube 112 such that the cable 102 has lifted off of the winding separator 110-3 but is still retained on the second side 110*d* of the next winding separator 110-4 by the flared first end 110*a*.

Figure 29:
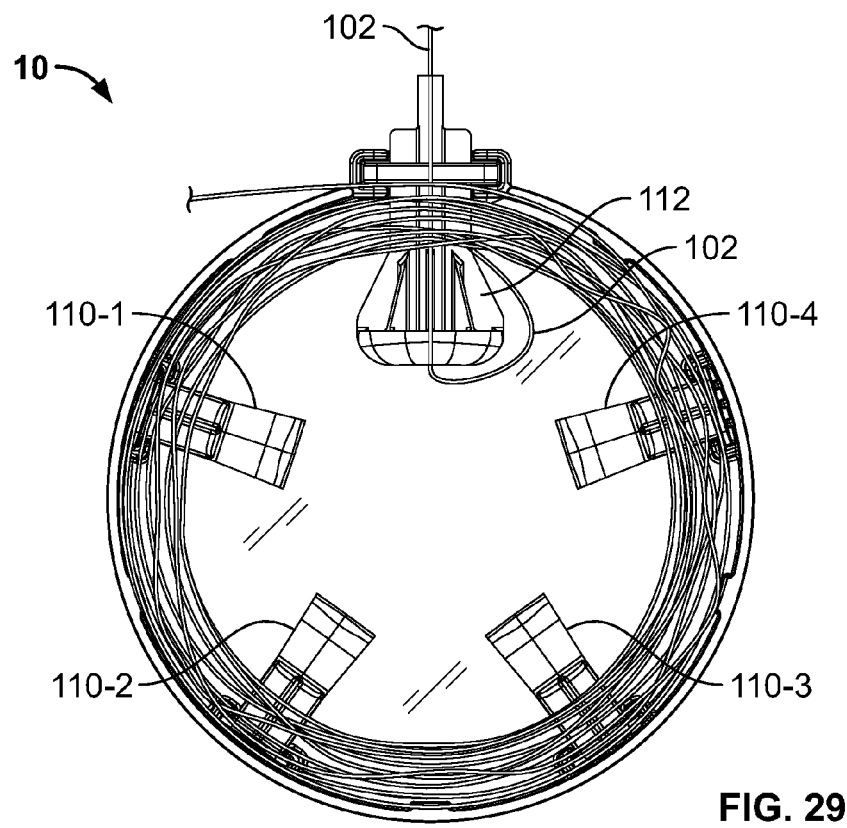
FIG. 29 is a perspective view of the packaged cable dispenser of FIG. 9 while dispensing cable in a fifth state.
Figure 30:
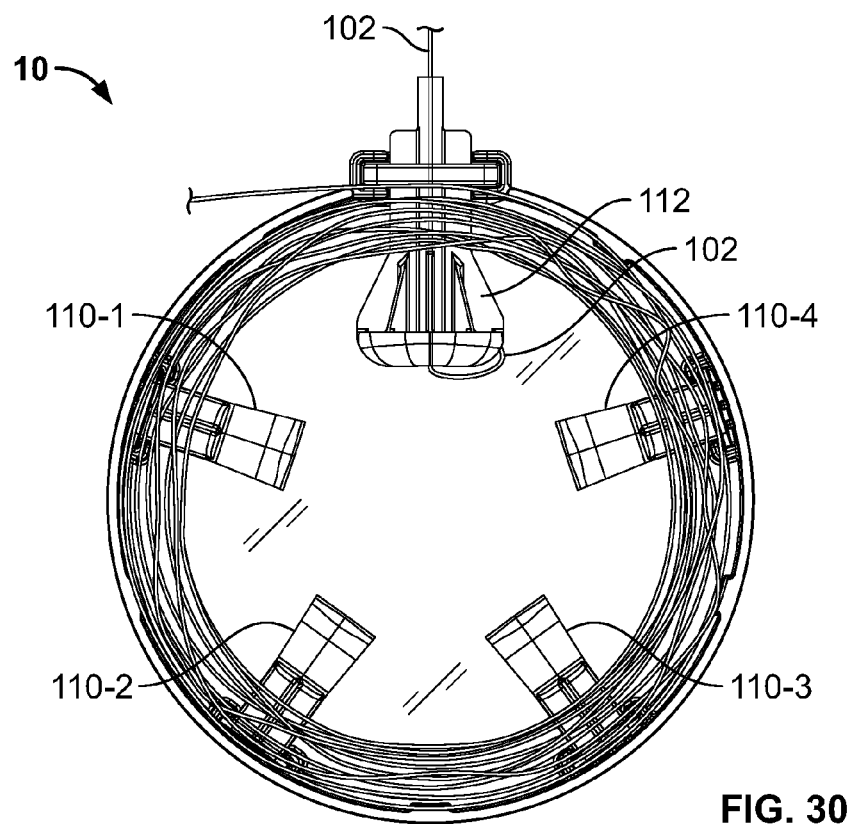
FIG. 30 is a perspective view of the packaged cable dispenser of FIG. 9 while dispensing cable in a sixth state.
Figure 31:
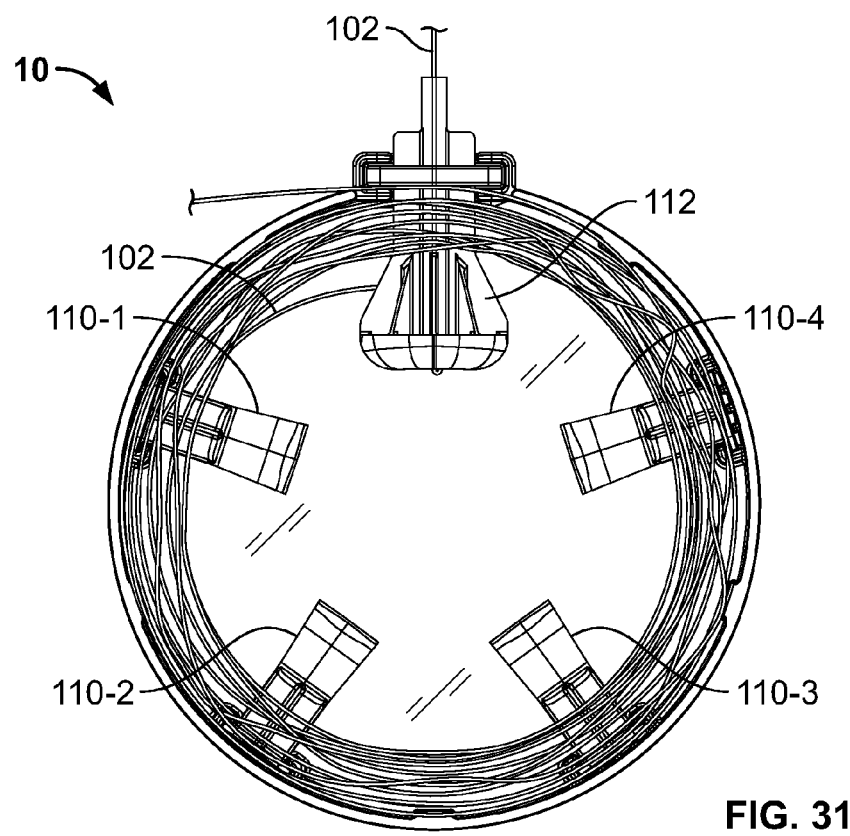
FIG. 31 is a perspective view of the packaged cable dispenser of FIG. 9 while dispensing cable in a seventh state.
Figure 32:
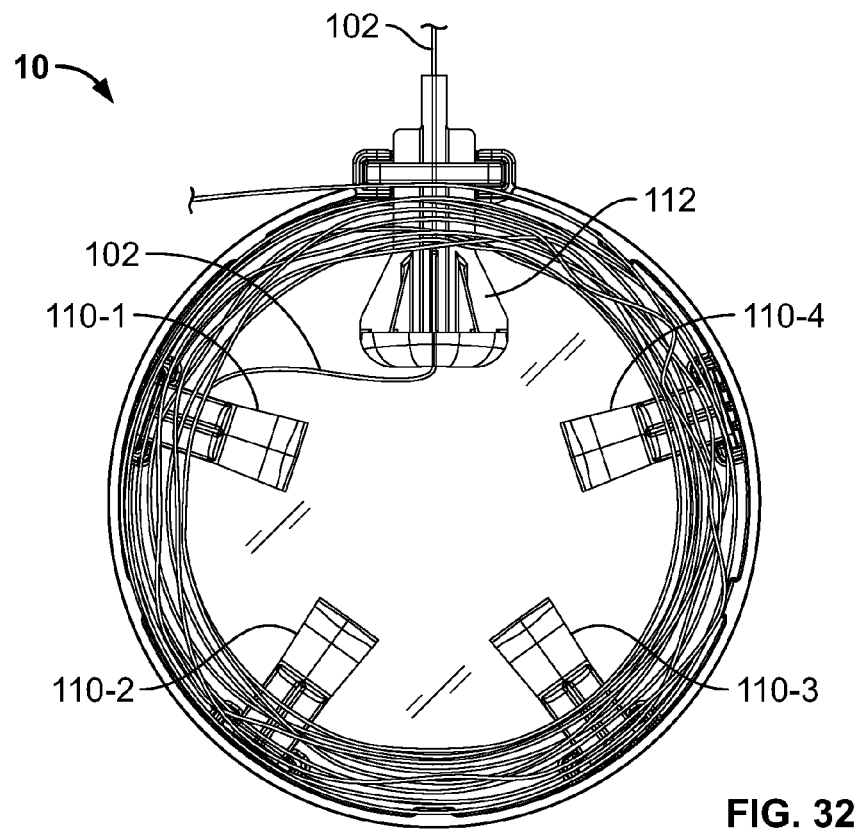
FIG. 32 is a perspective view of the packaged cable dispenser of FIG. 9 while dispensing cable in an eighth state.
Figure 33:
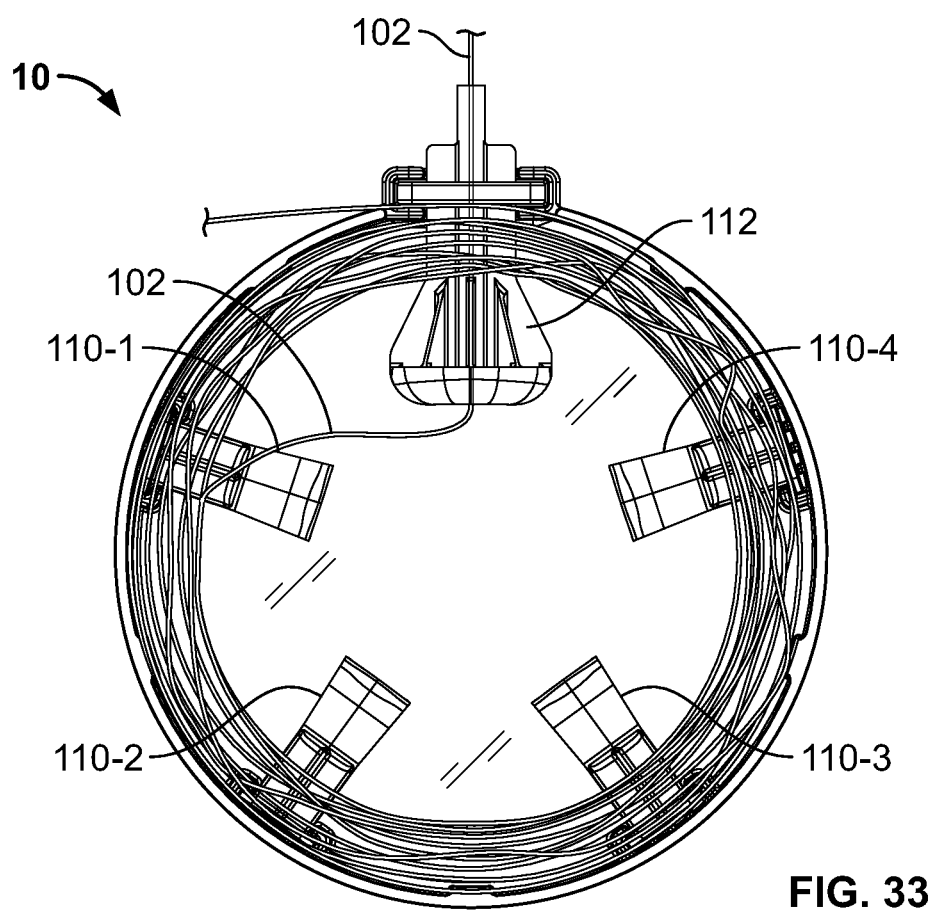
FIG. 33 is a perspective view of the packaged cable dispenser of FIG. 9 while dispensing cable in a ninth state.
Figure 34:
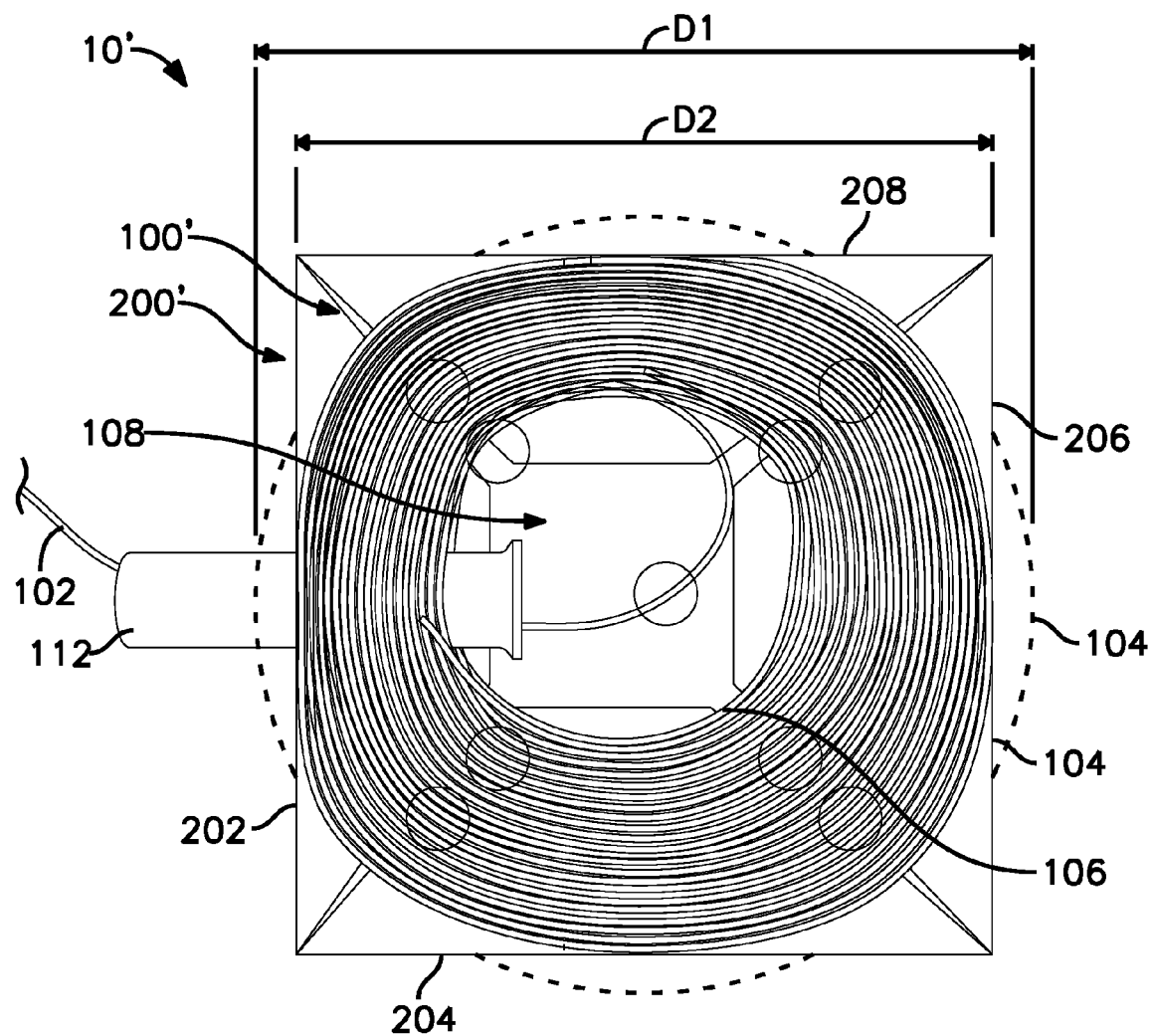
FIG. 34 is a top view of a second embodiment of a coreless wound coil disposed in a package having exemplary features of aspects in accordance with the principles of the present disclosure.
Figure 35:
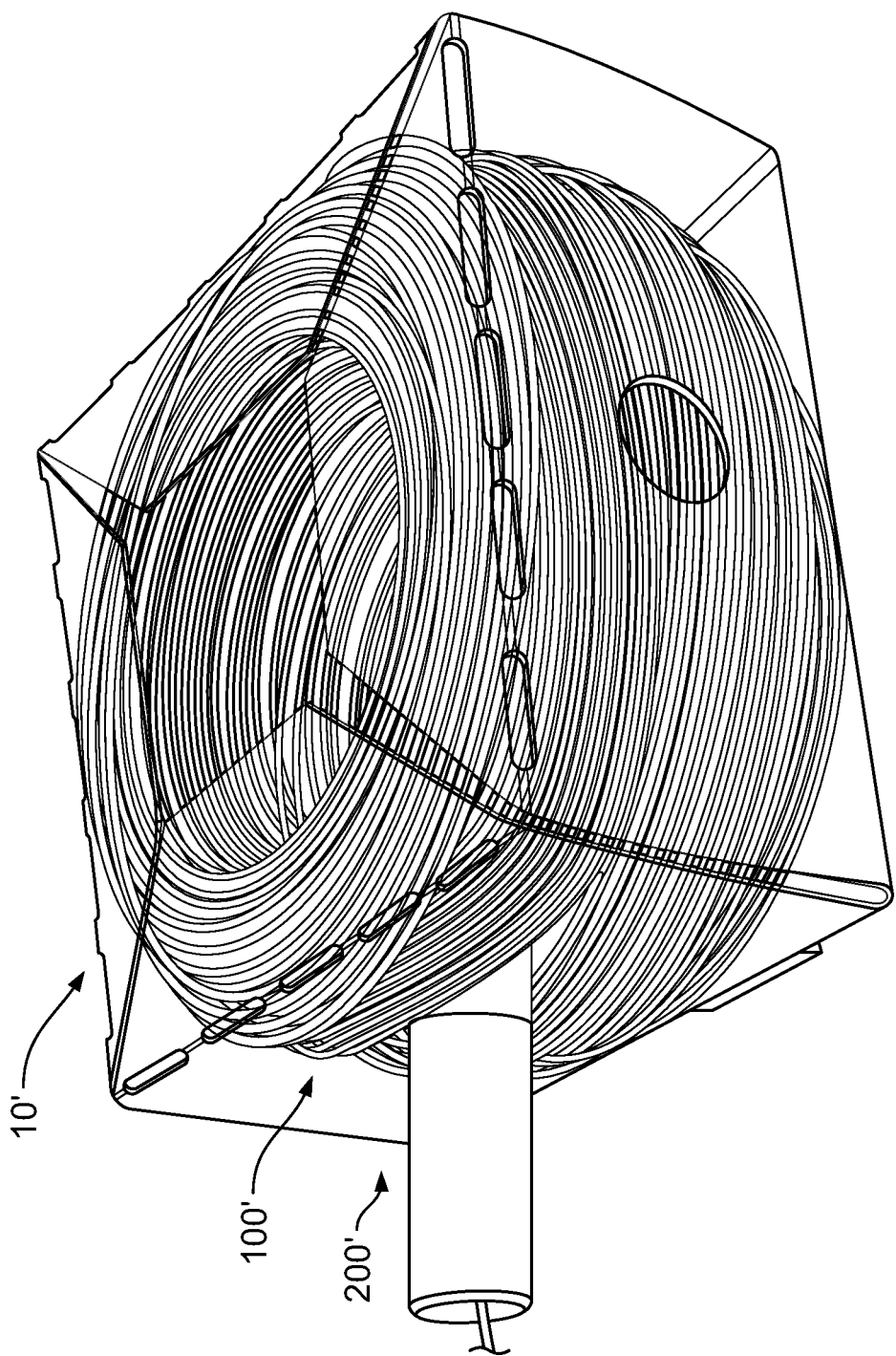
FIG. 35 is a perspective view of the coreless wound coil shown in FIG. 8.

Unlike the winding separators 110, the cable 102 is simultaneously drawn through and past the payout tube 112 which necessitates that the cable 102 flips over from one plane one side of the payout tube 112 to another plane on the other side of the payout tube 112. FIG. 29 shows the cable 102 at the beginning of this process wherein the cable has lifted from the winding separator 110-3 with the flared end 110*e* of the separator 110-3 having kicked the cable 102 out of plane such that the cable 102 can be transferred over from the second side 110*d* of separator 110-4 to the first side 112*c* of the payout tube 112. At the same time, the rounded leading edge 120*a* of the payout tube head portion 120 is ensuring that the cable 102 continues to flip over to the first side 112*c* as the cable draws nearer the payout tube 112. FIGS. 30-32 show the cable 102 as it traces around the outer portion 120*c* of the head portion and along the first side 120*c* of the payout tube 112 until the cable 102 finally flips over and is again engaged by the winding separator 110-1, but this time on the second side 110*d*. The unwinding process continues in the same manner for the next loop of cable 102 pulled through the payout tube 112, but on opposite sides of the winding separators 110 and the payout tube 112.

Figure 42:
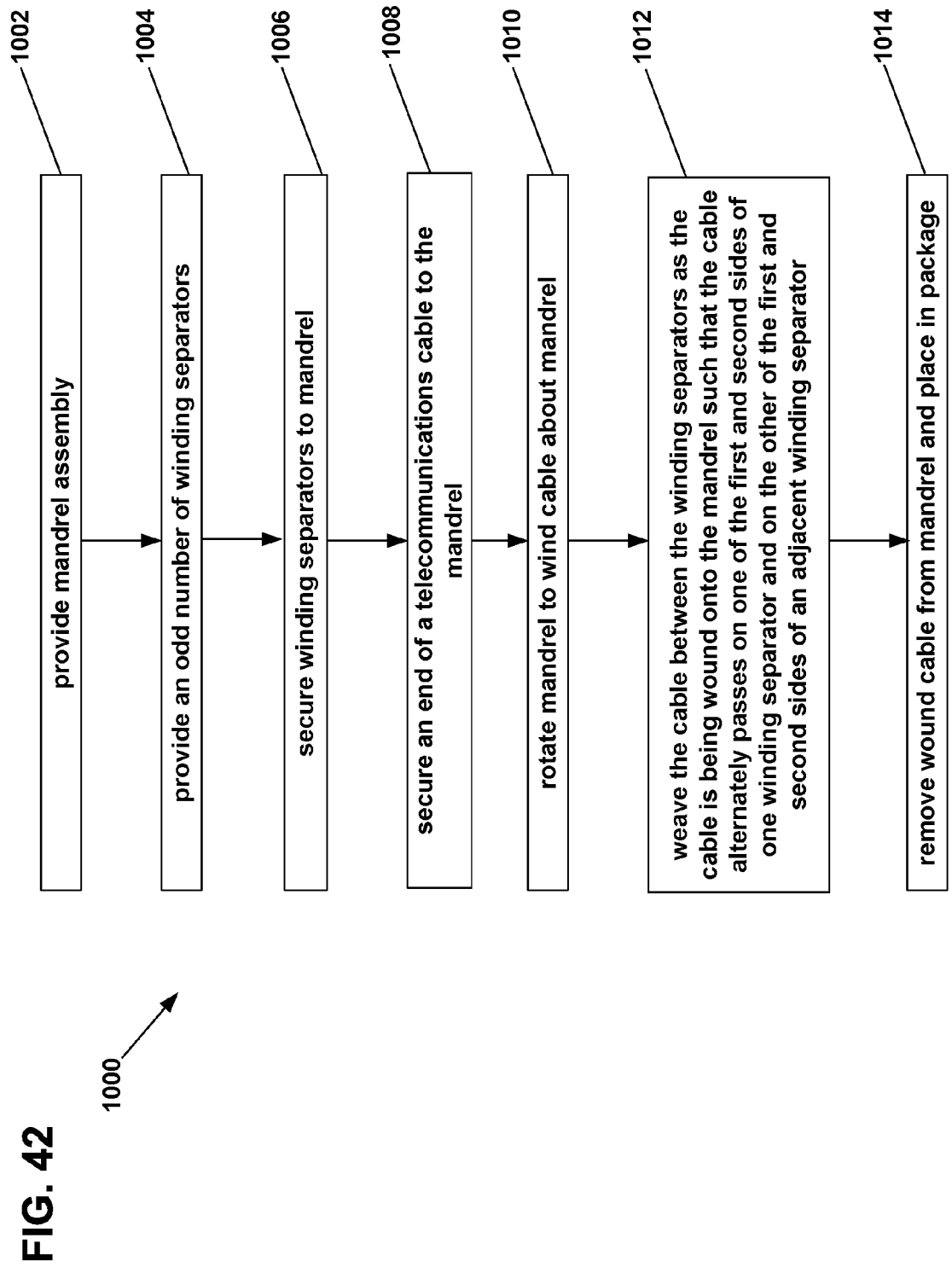
FIG. 42 is a schematic flow chart showing a first method for forming a coreless wound coil having exemplary features of aspects in accordance with the principles of the present disclosure.

Referring to FIG. 42, a method 1000 for forming the above described coreless wound coil 100 and packaged cable dispenser 10 is shown. In a step 1002, a mandrel assembly is provided having a longitudinal axis about which the mandrel is rotatable. In a step 1004, an odd number of at least three winding separators 110, 112 is provided, wherein each of the winding separators 110, 112 has a first side 110*c*, 112*c* and an opposite second side 110*d*, 112*d*. As described previously, one of the winding separators 110, 112 may be configured as a payout tube 112. In another step 1006, the winding separators 110, 112 are secured to the mandrel assembly. The flared ends 110*a* of the winding separators 110 and the head portion 120 of the payout tube 112 may beneficially serve as gripping locations for the mandrel assembly, which may be provided as two halves that clamp on each side of the separators 110, 112. In a step 1008, an end 102*a* of the telecommunications cable 102 is secured to the mandrel. The mandrel is then rotated in a step 1010 to cause the telecommunications cable 102 to be wound about the mandrel to form a wound coil 100 of telecommunications cable 102. In a step 1012, the telecommunications cable 102 is woven between the winding separators 110, 112 as the telecommunications cable 102 is being wound onto the mandrel. Accordingly, the telecommunications cable 102 alternately passes on one of the first and second sides 110*c*, 112*c*, 110*d*, 112*d* of one winding separator 110, 112 and on the other of the first and second sides 110*c*, 112*c*, 110*d*, 112*d* of an adjacent winding separator 110, 112. In a step 1014, the wound cable 102 can be removed from the mandrel and installed within a package 200 to form a packaged cable dispenser 10.

Figure 36:
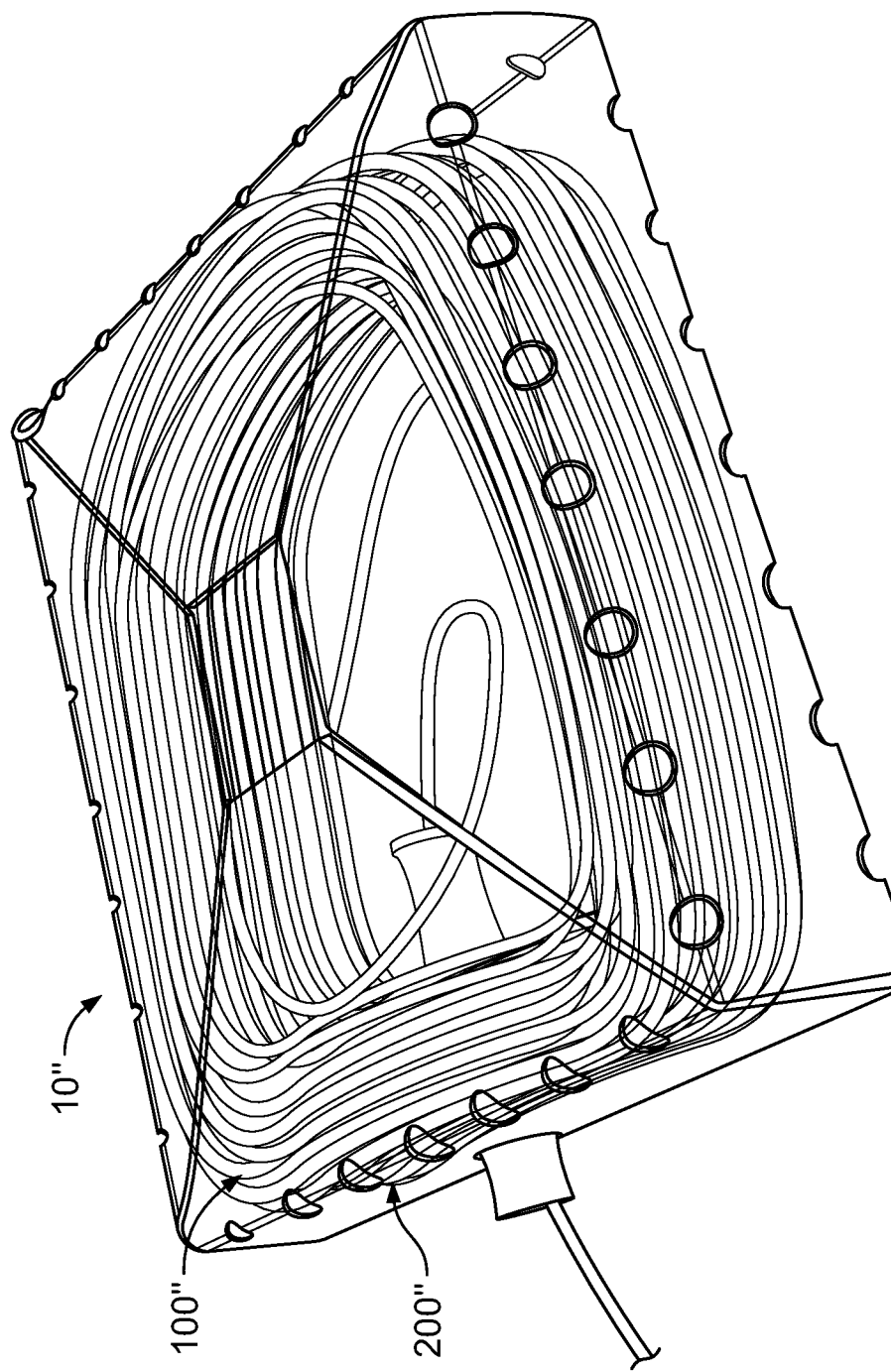
FIG. 36 is a perspective view a third embodiment of a coreless wound coil disposed in a package having exemplary features of aspects in accordance with the principles of the present disclosure.
Figure 37:
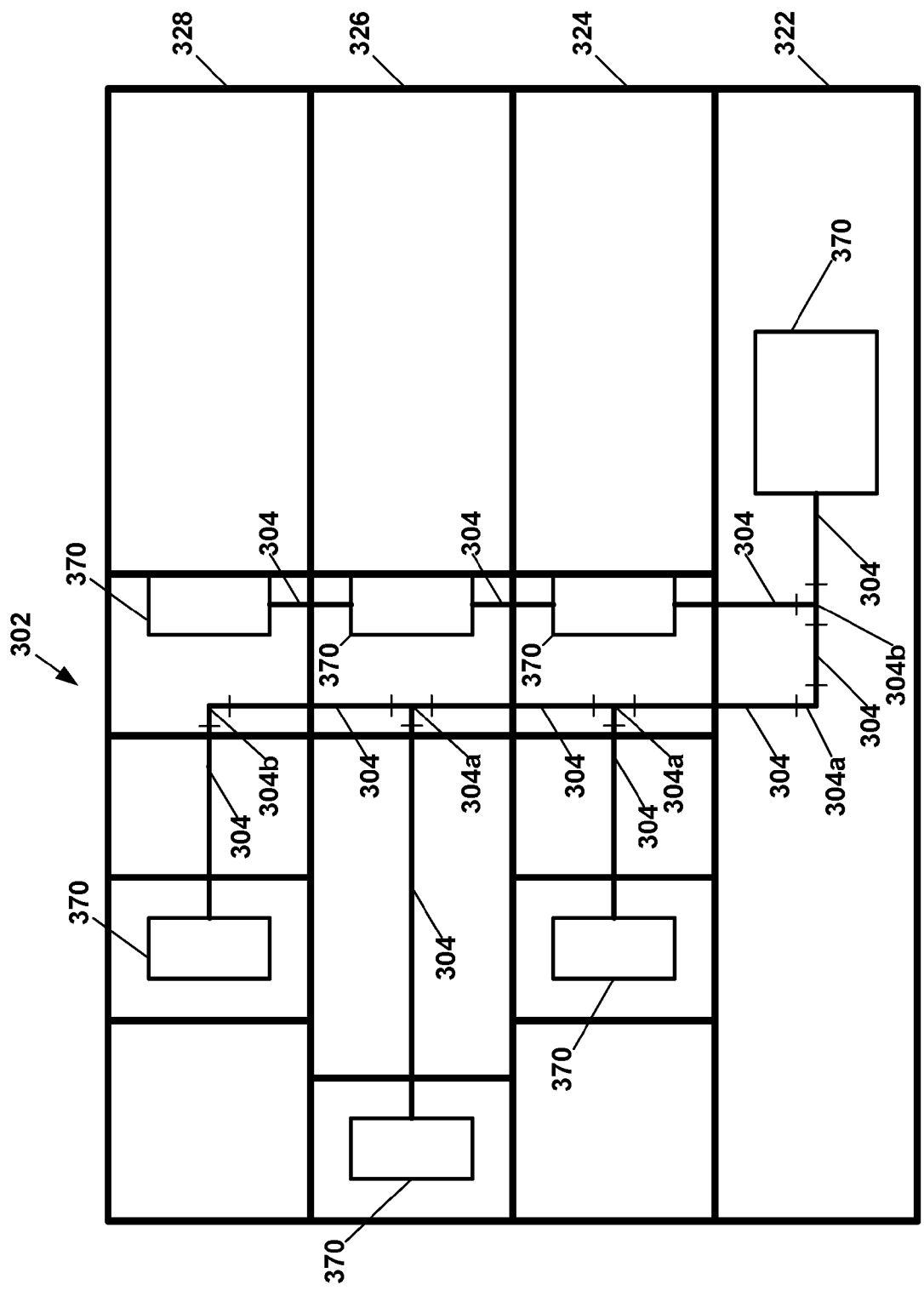
FIG. 37 is a schematic side view of a building structure within which a micro-conduit system is installed.
Figure 38:
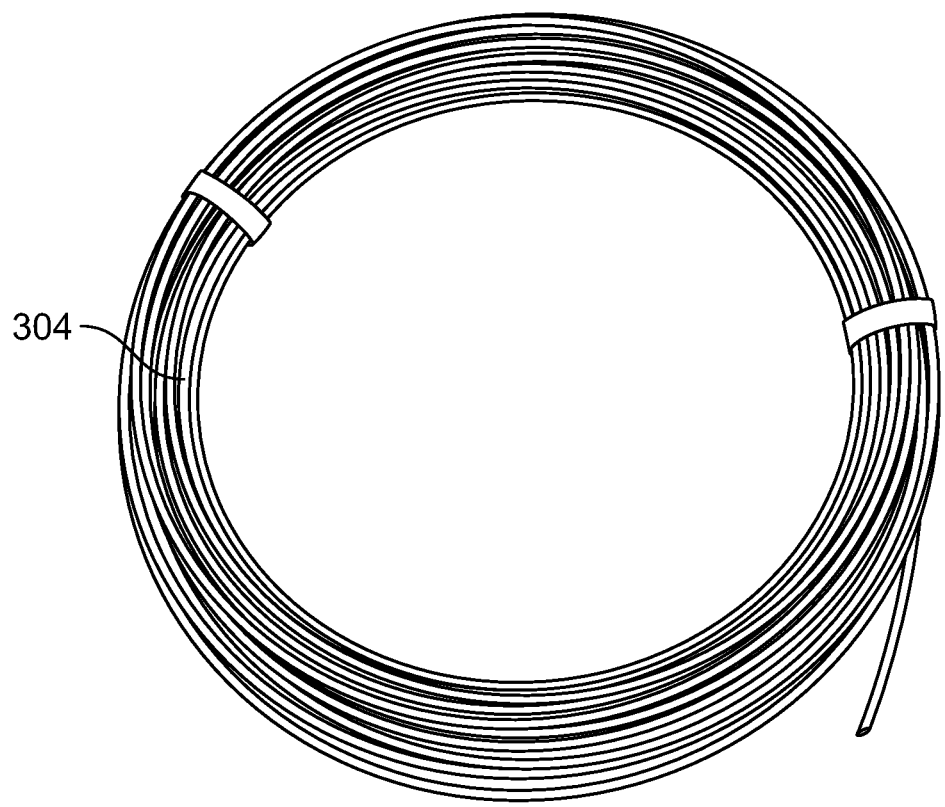
FIG. 38 is a perspective view of a coil of micro-conduit usable with the micro-conduit system shown in FIG. 11.
Figure 39:
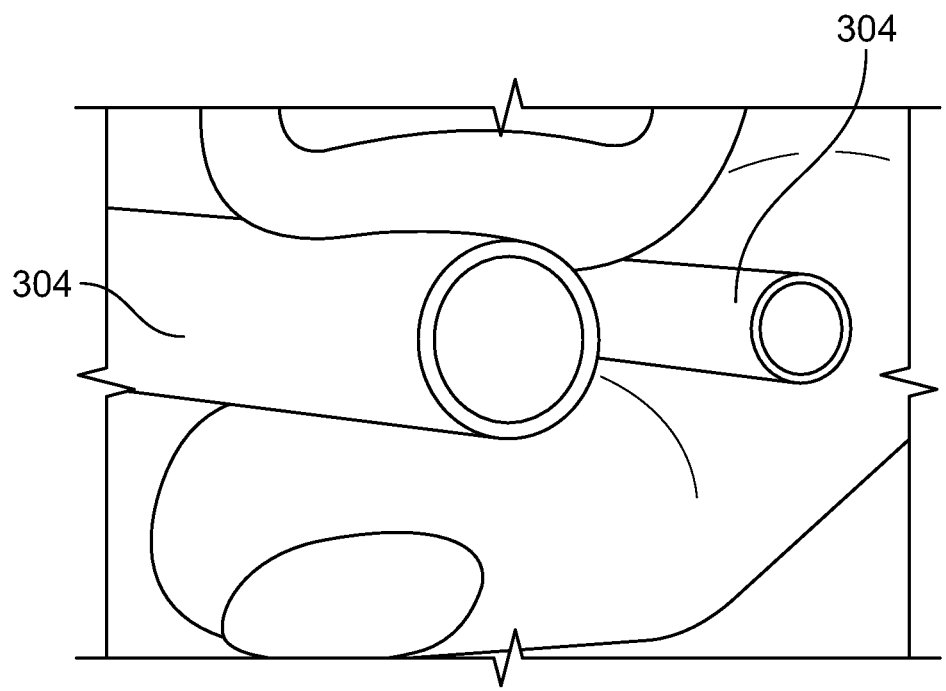
FIG. 39 is a perspective end view of two sizes of micro-conduit usable with the micro-conduit system shown in FIG. 11.

Referring back to FIGS. 34-35, a second embodiment a packaged cable dispenser 10' including a coreless wound coil 100' disposed in a package 200' is disclosed. A third embodiment 10" is shown at FIG. 36, which includes the same features of the second embodiment, but with slightly different dimensions. The second and third embodiments 10' and 10" share many features in common with the first embodiment 10. Accordingly, the description for the first embodiment 10 is applicable for the second and third embodiments 10' and 10", to the extent that similar features exist. Accordingly, like references numbers will be used for like features.

In one aspect, the coreless wound coil 100' includes a length of a length of telecommunications cable 102 wound to define an exterior winding surface 104 and an interior winding surface 106 further defining a hollow interior 108. In another aspect, the package 200' includes interconnected sidewalls 202, 204, 206, 208 extending between a top side 210 and a bottom side 212. The sidewalls 202, 204, 206, 208 can define an interior perimeter 220. As shown, the exterior winding surface 104 of the wound coil 100 is within the interior perimeter 220 of the package 200. The wound coil 100' can be formed in the same general manner as that described for coil 100, wherein the cable 102 is moved back and forth across the width of the coil 100 such that the segment of cable 102 being wound crosses over the previously wound segment of cable 102 one or more times for each wrap of the coil 100.

As with the first embodiment 10, a payout tube 112 can be provided. As shown, the payout tube 112 extends through the wound coreless coil 100' between the hollow interior 108 and the exterior surface 104 of the wound coreless coil 100'. The payout tube 112 further extends through one of the interconnected sidewalls 202, 204, 206, 208 of the package 200'. The end 102*a* of the telecommunications cable 102 extends through the payout tube 112 from the interior winding surface 106 to allow the coil 100' to be unwound from the interior winding surface 106 to the exterior winding surface 104.

In contrast to the first embodiment of the packaged cable dispenser 10, which uses winding separators 110, 112 to maintain the winding pattern of the wound coil 100, the second embodiment 10' utilizes the package 200' to maintain the winding pattern without the use of embedded separators 110. The coil 100' can be initially provided as an initially generally cylindrically shaped coil 100 having an exterior winding surface 104 with a dimension D1 while the sidewalls 202, 204, 206, 208 of the package 200' form a non-cylindrically shaped package having a dimension D2 that is smaller than the dimension D1. As such, when the wound coreless coil 100' is inserted into the package 200', the wound coreless coil 100' is compressed by the interconnected sidewalls 202, 204, 206, 208 of the package 200' thereby causing the shape of the wound coreless coil 100' to be deformed to conform to the interior perimeter 220 of the package 200'. Consequently, the wound coreless coil 100' has an obround or non-cylindrical shape once disposed in the package 200'. The compression caused by the package 200' aids in maintaining the coil 100' in a wound state even after a significant portion of the cable 102 has been removed from the package 200' such that the winding pattern of the coil 100' remains until all or nearly all of the cable has been removed from the package.

Figure 43:
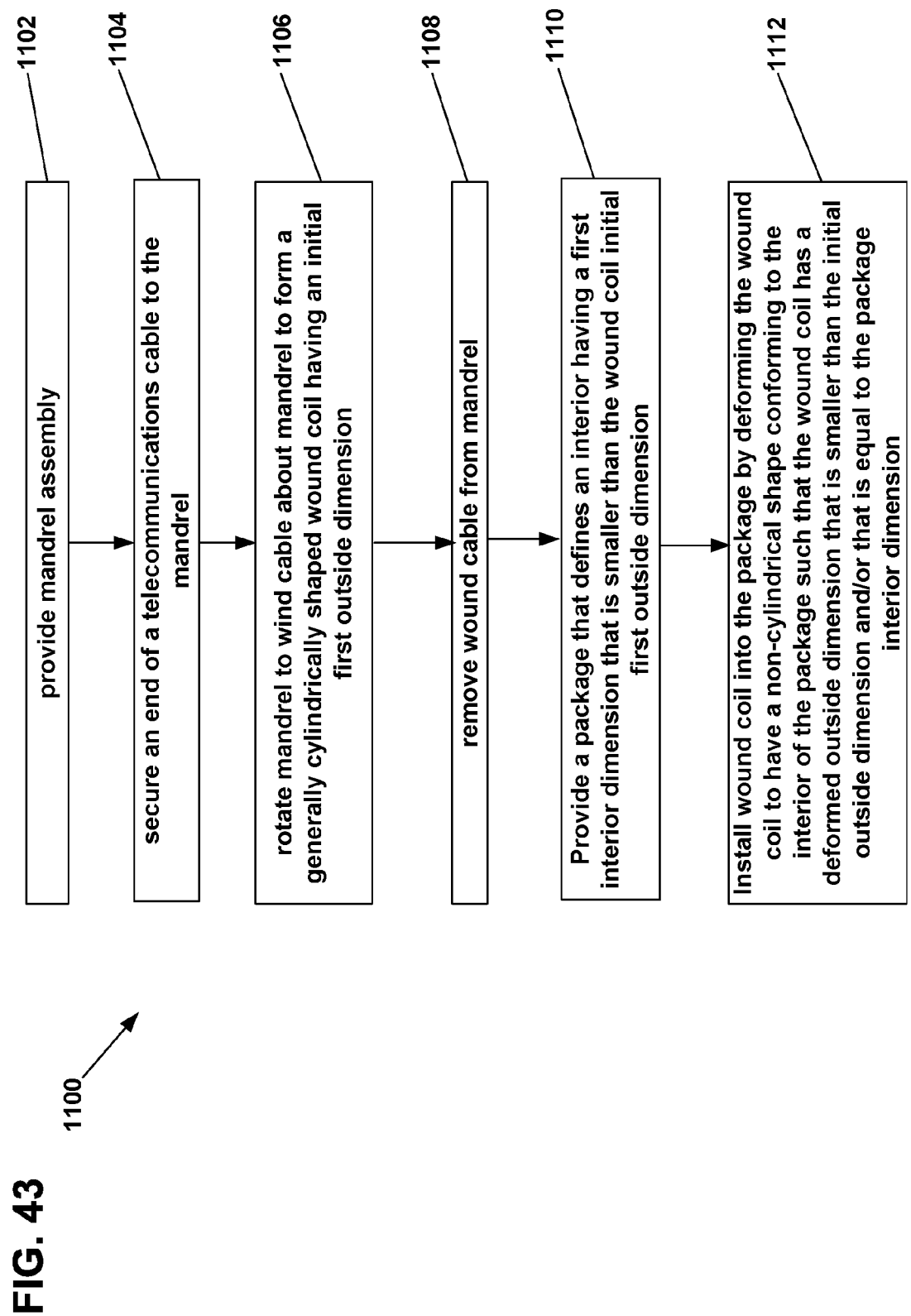
FIG. 43 is a schematic flow chart showing a second method for forming a coreless wound coil having exemplary features of aspects in accordance with the principles of the present disclosure.

Referring to FIG. 43, a method 1100 for forming the above described coreless wound coil 100' and packaged cable dispenser 10' is shown. In a step 1102, a mandrel assembly is provided having a longitudinal axis about which the mandrel is rotatable. In a step 1104, an end 102*a* of the telecommunications cable 102 is secured to the mandrel. The mandrel is then rotated in a step 1106 to cause the telecommunications cable 102 to be wound about the mandrel to form a generally cylindrically shaped wound coil 100 of telecommunications cable 102. In one embodiment, the cable 102 is moved back and forth across the width of the wound coil 100 as it is being wound to cause the segment of cable 102 currently being wound to cross and overlap the previously wound segment of cable 102 at least once. Once wound, the generally cylindrical-shaped wound coil has an initial first outside dimension and can be removed from the mandrel assembly in a step 1108. In a step 1110, a package is provided that defines an interior having a first interior dimension that is smaller than the wound coil initial first outside dimension. In a step 1112, the wound coil is installed into the package by deforming the wound coil to have a non-cylindrical shape conforming to the interior of the package such that the wound coil has a deformed outside dimension that is smaller than the initial outside dimension and/or that is equal to the package interior dimension.

Referring to FIGS. 45-53, another variation of the packaged cable dispenser 10''' is shown. The description for the first embodiment 10 is applicable for the fourth embodiment 10''', to the extent that similar features exist. Accordingly, like references numbers will be used for like features.

The dispenser 10''' includes winding separators 111 having features in common with the winding separators 110, 112 shown in the example presented at FIGS. 8-33. As such, the description for winding separators 110, 112 is applicable to the winding separator 111 in certain aspects. In the example shown, three winding separators 111 are shown, but other odd number of separators may be used, for example 5, 7, and 9 separators.

In one aspect, the winding separators 111 are formed by a pair of identical first and second half pieces 113. The individual half pieces 113 can be most easily seen at FIGS. 47-50 in a disassembled state. Each half piece 113 is provided with a pair of posts 113*a* that insert into recesses 113*b* at each end of the half piece 113. Each half pieces is also provided with a plurality of second posts 113*c* received by corresponding recesses 113*d* between the posts and recesses 113*a*, 113*b*. Each half piece 113 includes a channel 113*e* extending between the ends of the half piece 113. In the example shown, the recesses 113*b*, 113*d* extend all of the way through the half piece 113 and are thus apertures through the half piece 113. Alternatively, the recesses 113*b*, 113*d* can extend only partially into the half piece material.

When mated together, the channels 113*e* of each half piece 113 form the payout tube 112 through which a cable 100 can be fed. The second posts and recesses 113*c*, 113*d* aid in securing the half pieces 113 along the channel 113*e*. The posts and recesses of the half piece 113 are structured such that the half pieces can be press-fit together and such that they are held together by frictional forces. This configuration allows the half pieces 113 to be pulled apart by a user after dispensing the cable 100. This functionality is particularly desirable for the winding separator 111 that is actually used as the payout tube 112 for dispensing cable as having separable half pieces 113 allows the winding separator to be removed from the cable 100 without requiring cutting. Other attachment means may be used. In an alternative embodiment, the winding separator 111 that is used for the payout tube 112 is formed with the half pieces 113 and the remaining separators 111 are formed as a single unitary component.

Each half piece also defines a pair of channels 113*f* at one end of the half piece and a pair of channels 113*g* at the other end of the half piece. The channels 113*f* extends between a funnel shaped inlet surface 113*h* and a funnel shaped outlet surface 113*j* As discussed later, these channels enable the winding separators 111 to be secured to either a winding hub assembly 600 and/or to a winding ring assembly 200'. Surfaces 113*h, j* provide a smooth, rounded, and gradually expanding surface for guiding the cable 100.

Once mated together, the winding separators 111 define a first end 111*a* at which a head portion 111*c* is defined and a second end 110*b* at which a base portion 111*d* is defined. A stem portion 111*e* is defined between the head and base portions 111*c*, 111*d*. The stem portion 111*e* is generally similar to the stem portion 116 of separator 110 and the head portion 111*c* is generally similar to the flared first end 110*a* of separator 110. Accordingly, these features need not be further discussed here. However, and as stated previously, the separators 111 define a central payout tube 112 which extends through the head portion 111*c*. Accordingly, during dispensation of the cable 100, the cable 100 will continually loop around the head portion 111*c* in the same general manner as described for the head portion 120 of separator 112. In the example shown, the separators 111 are held in place by a ring assembly 200' that does not have end walls on either side of the separators 111. It has been discovered of this application that a shape similar to head portion 120 can be replaced with a head portion shaped similarly to head portion 111*c* (or 110*a*) with satisfactory operation when end walls (e.g. 210, 212) are not present.

Figure 47:
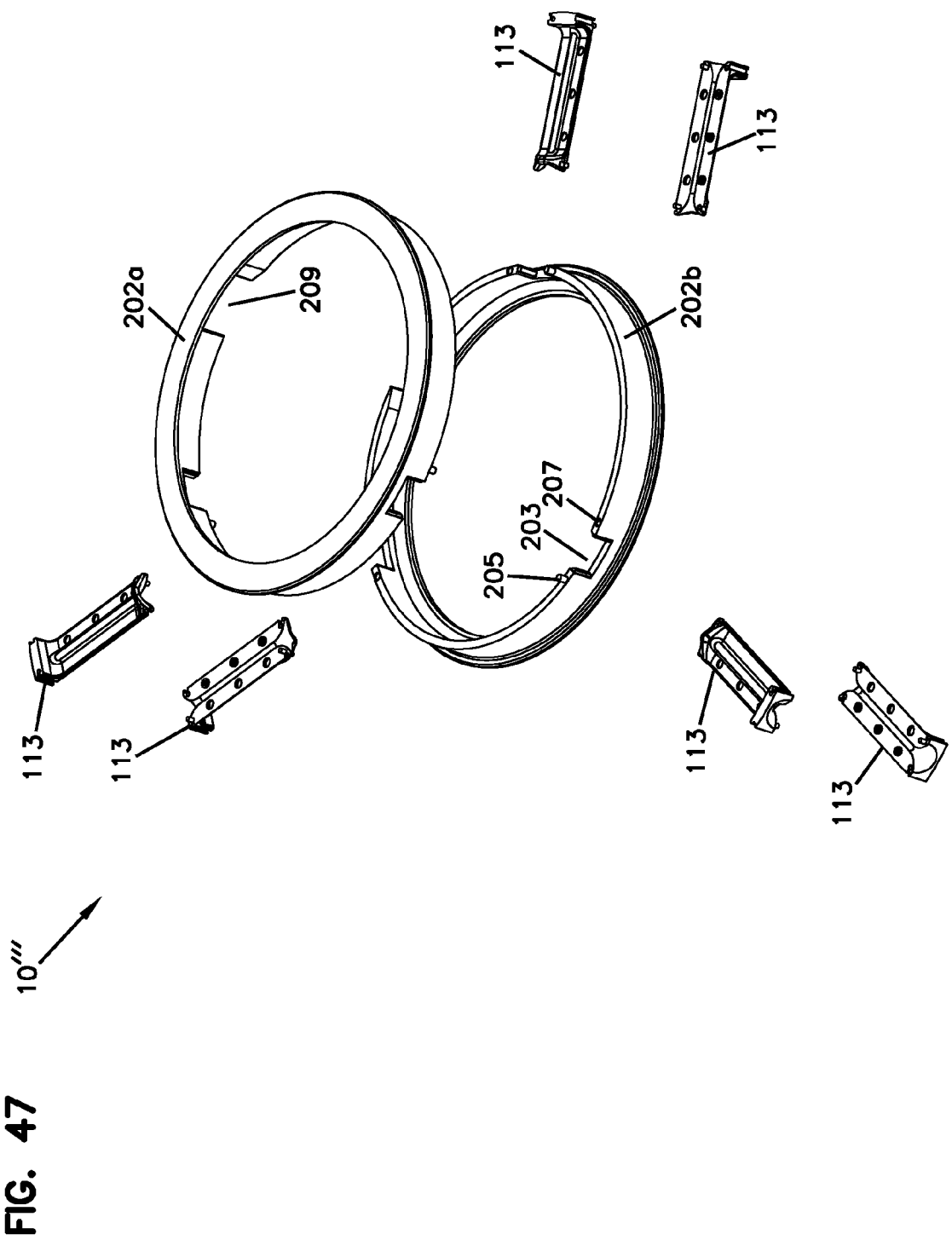
FIG. 47 is an exploded perspective view of the dispenser shown in FIG. 45.
Figure 50:
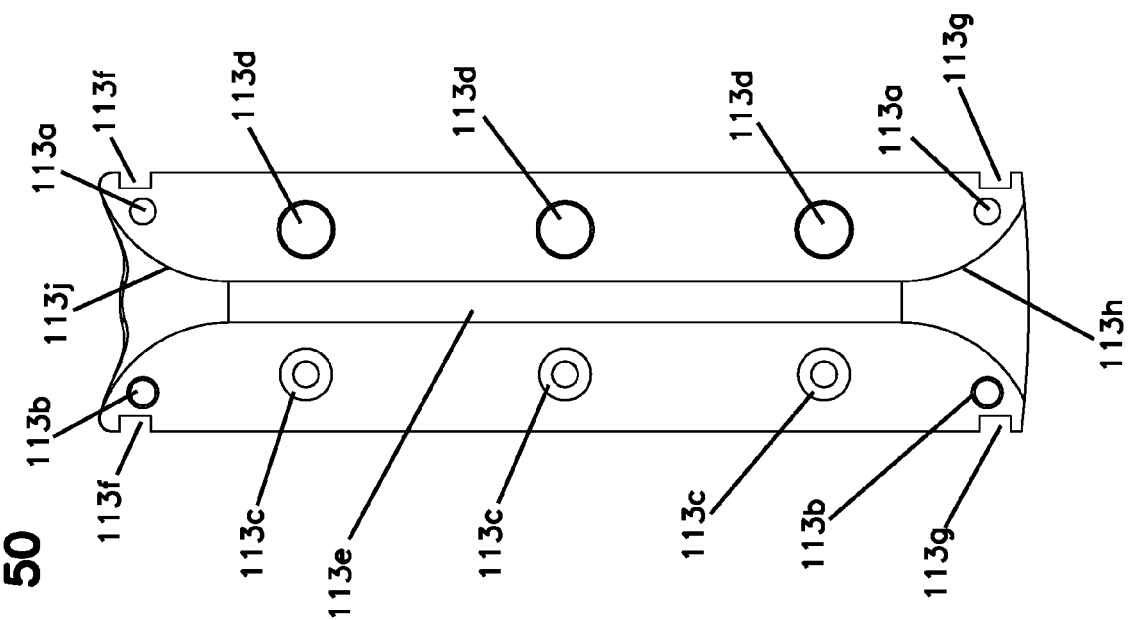
FIG. 50 is a bottom view of the winding separator half piece shown in FIG. 49.
Figure 49:
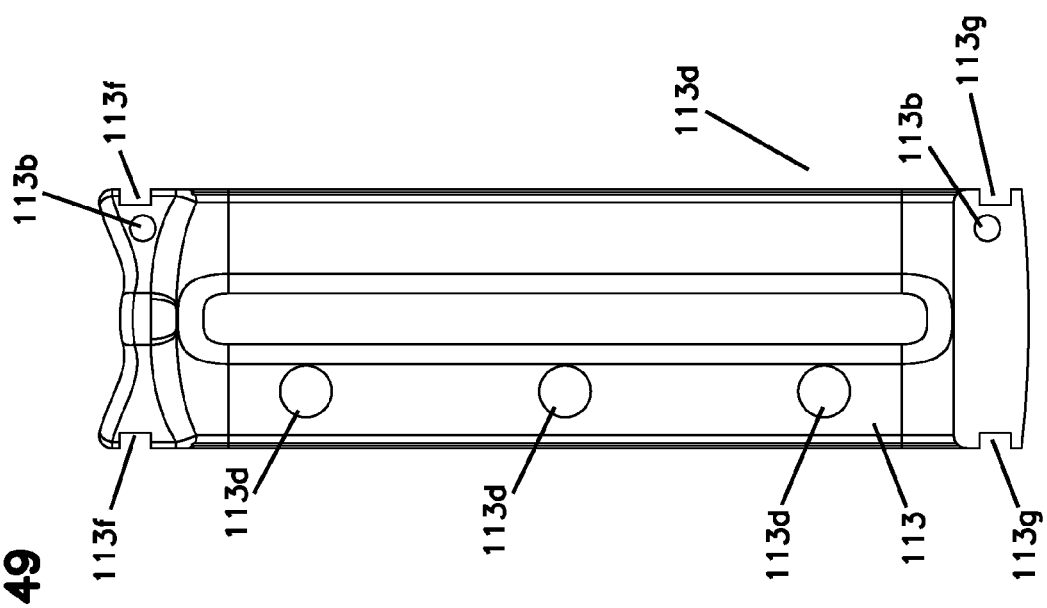
FIG. 49 is a top view of a winding separator half piece shown in FIG. 48.

Referring to FIG. 47, it can be seen that the dispenser 10''' is provided with a ring assembly 202 having a first ring part 202*a* and a second ring part 202*b*. Each of the ring parts 202*a*, 202*a* has a notch 203 for receiving the flanges of the separators in a secure position. Each ring part additionally has a plurality of pins and recesses 205, 207 for forming a press-fit connection with the other ring part. As with the separators 111, the ring assembly 202 can be disassembled after dispensation of the cable is complete 100. The ring parts also have a notch 209 for allowing the free end of the cable 100 to pass through the ring assembly 202 that functions as a sidewall to support the cable and that functions to retain the winding separators 110. Each ring part 202*a*, 202*b* also has a ridge or rim 290 that is raised from an outer surface 292 of the ring such that a trough is formed about the ring part 202*a*, 202*b*. This features allows cable to be wound about the ring assembly 202 outer surface 292 and retained from falling off by the ridges 290.

Figure 51:
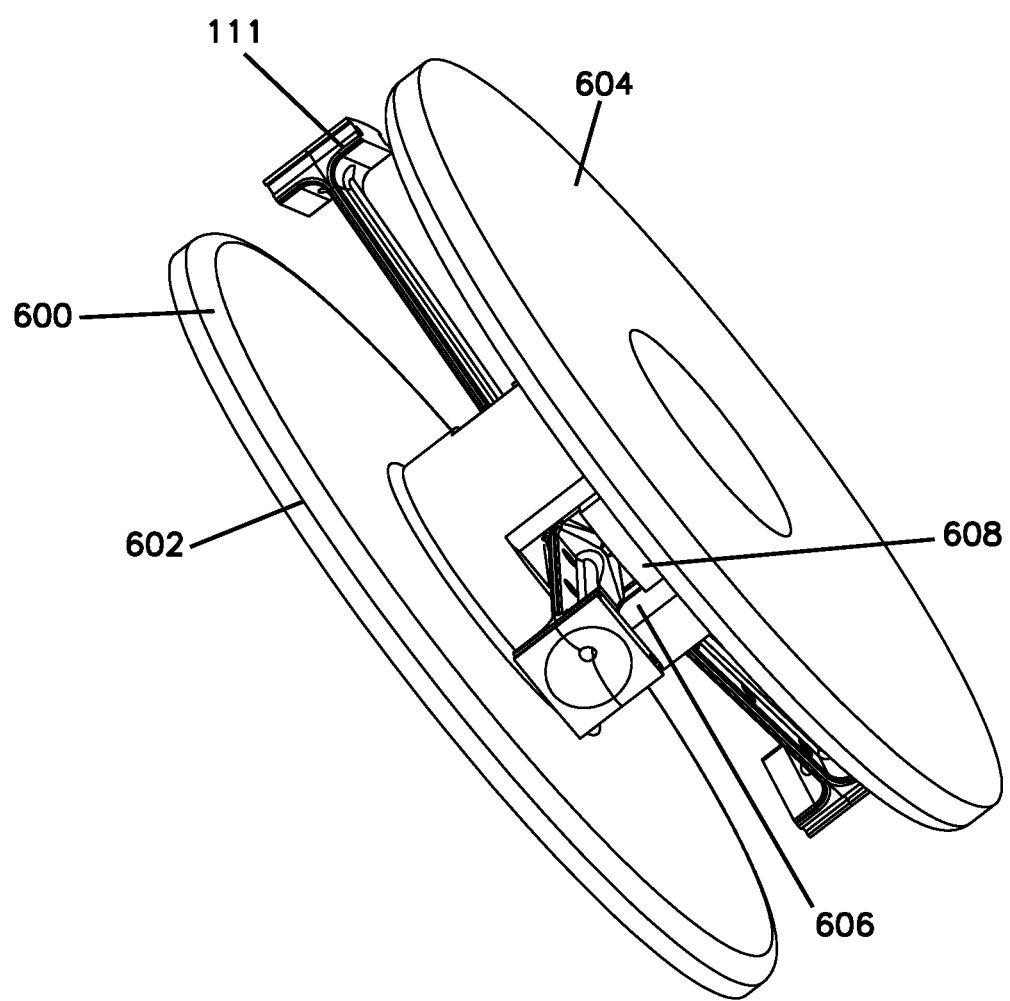
FIG. 51 is a perspective view of the winding separators of the dispenser shown in FIG. 45 mounted into a winding hub assembly.
Figure 52:
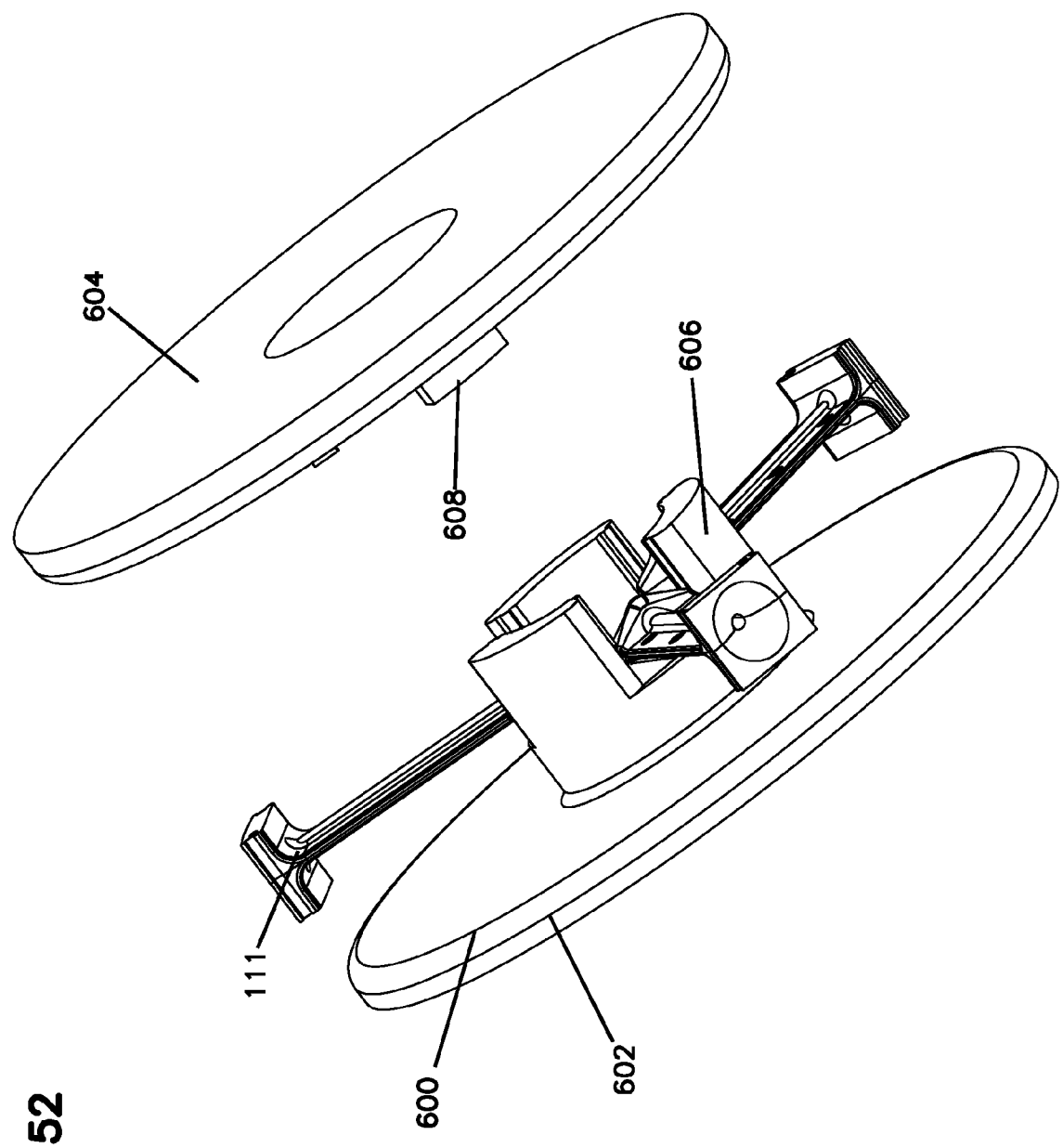
FIG. 52 is a perspective view of the winding separators and hub assembly shown in FIG. 51, with a second hub assembly part removed from a first hub assembly part.
Figure 53:
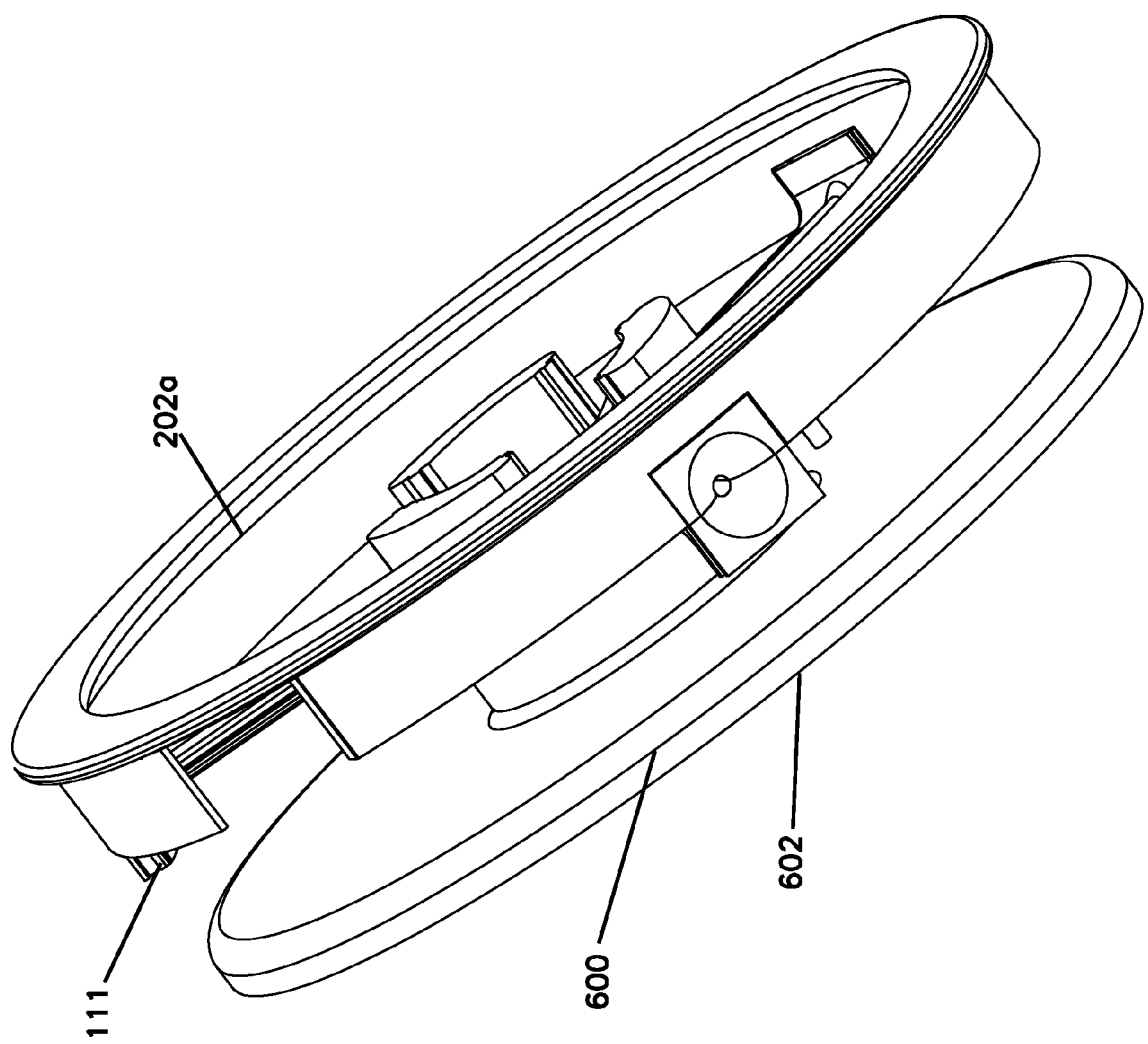
FIG. 53 is a perspective view of the assembly shown in FIG. 52, with a winding ring first part mounted to the winding separators.

Referring to FIGS. 51-53, a method by which the cable 100 can be wound onto the dispenser 10''' and packaged for dispensation through the use of a winding hub assembly 600 is depicted. As shown at FIG. 51, the winding separators 111 are installed onto the winding hub assembly 600, which includes a first hub part 602 that is mated to a second hub part 604 in a press-fit manner. The first hub part 602 has a plurality of notches 606 while the second hub part 604 has a plurality of projections 608. The notches 606 are configured to engage with the channels 113*f* defined in the winding separators 111 while the projections 608 close off the open end of the notches 606 to secure the separators 111 onto the winding hub assembly. In the position shown at FIG. 51, the cable 100 can be wound about the hub and around the separators 111 in a manner similar to described already for dispenser 10. In one example, the first hub part 602 is mounted to a winding machine. Once winding is complete, the second hub part 604 can be removed from the first hub part 602, as shown in FIG. 52. Once the second hub part 604 is removed, the first ring part 202a can be installed onto the winding separators 110, as shown at FIG. 53. After this step, the first ring part 202a and separators 111 can be removed from the first winding hub part 602 and the second ring part 202b can be press fit onto the first ring part 202a, as shown at FIG. 45.

Figure 11:
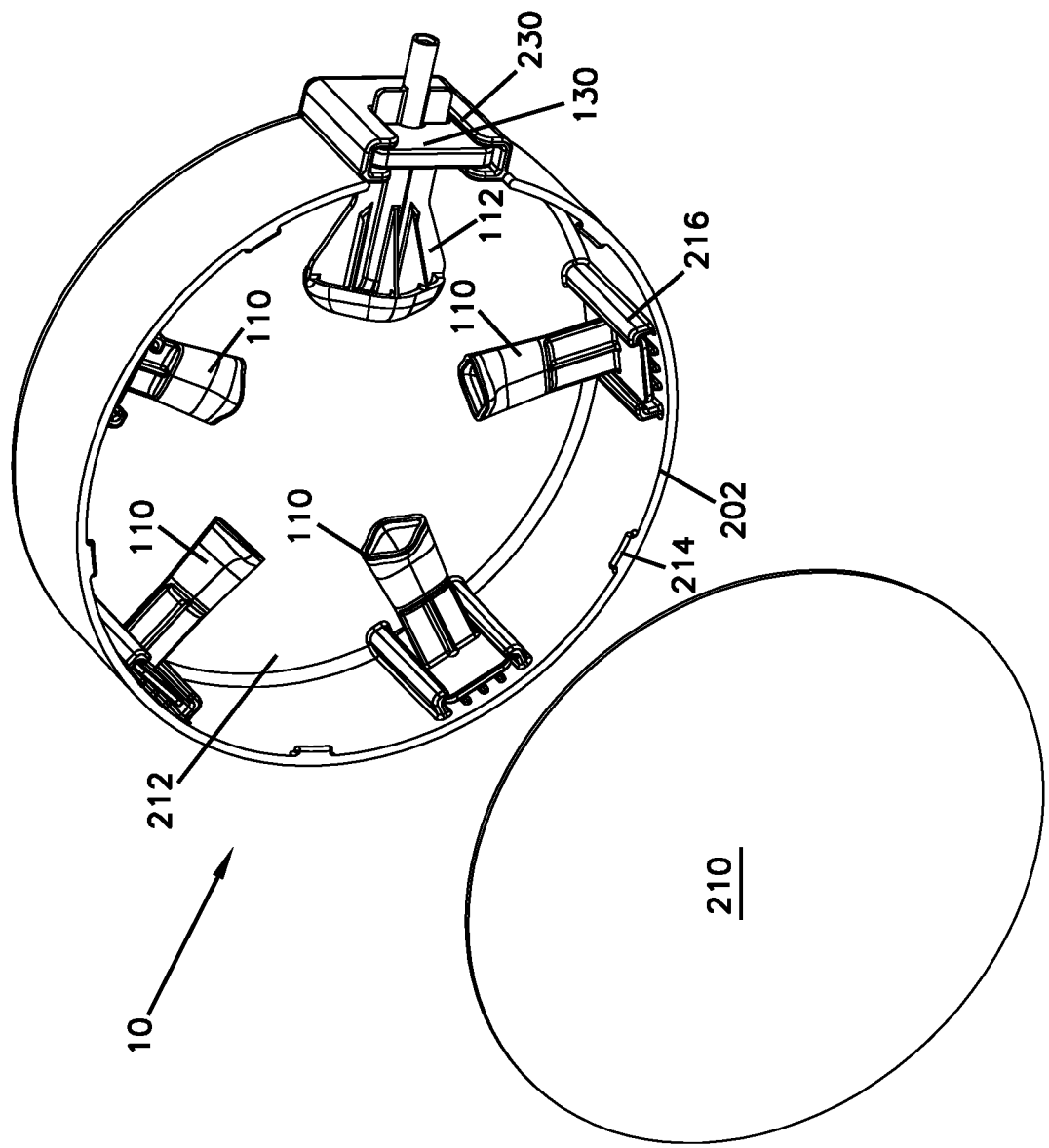
FIG. 11 is a perspective view of the packaged cable dispenser of FIG. 9 with the top wall removed from the housing.
Figure 12:
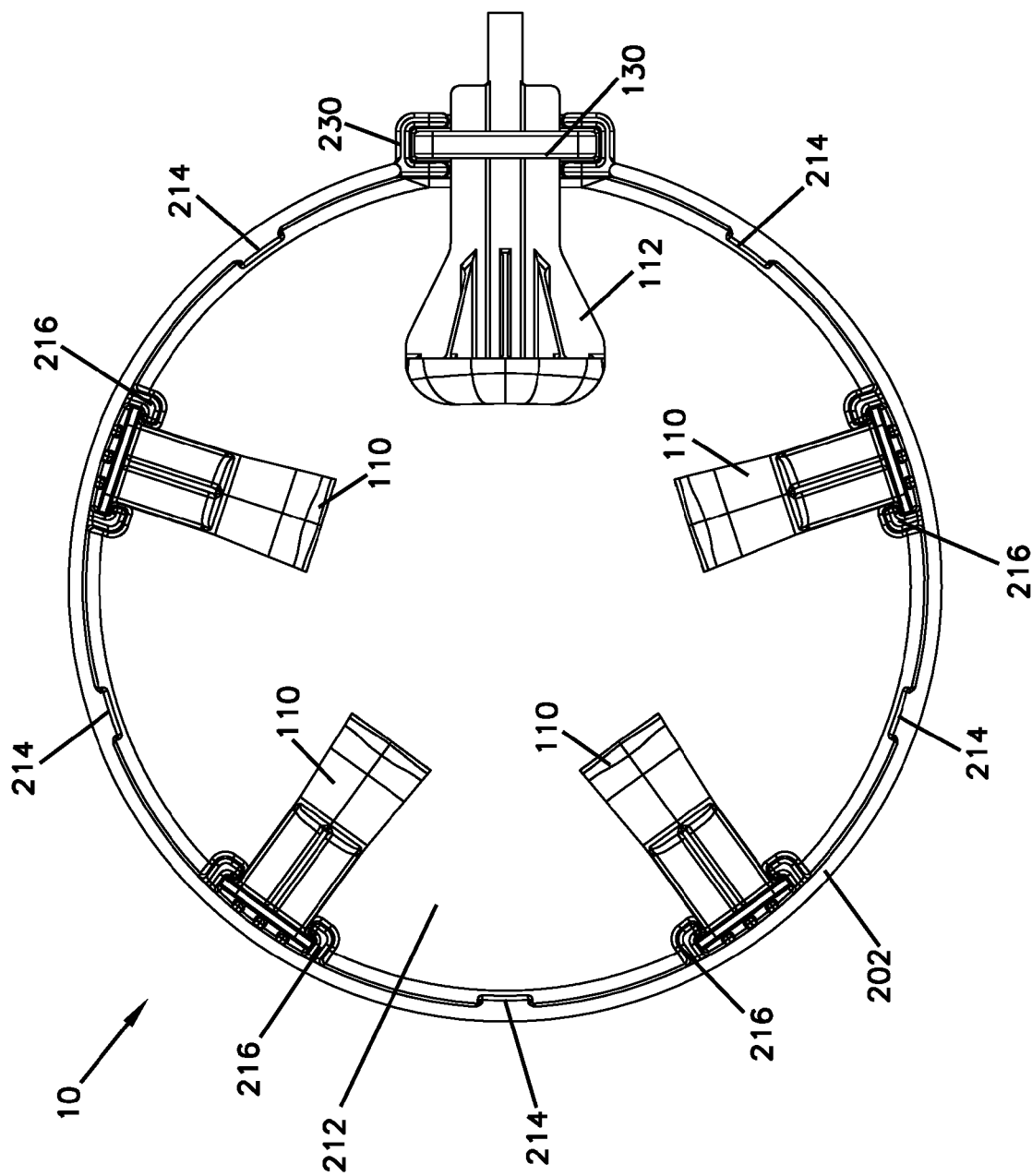
FIG. 12 is a top view of the packaged cable dispenser of FIG. 9 with the top wall removed from the housing.
Figure 13:
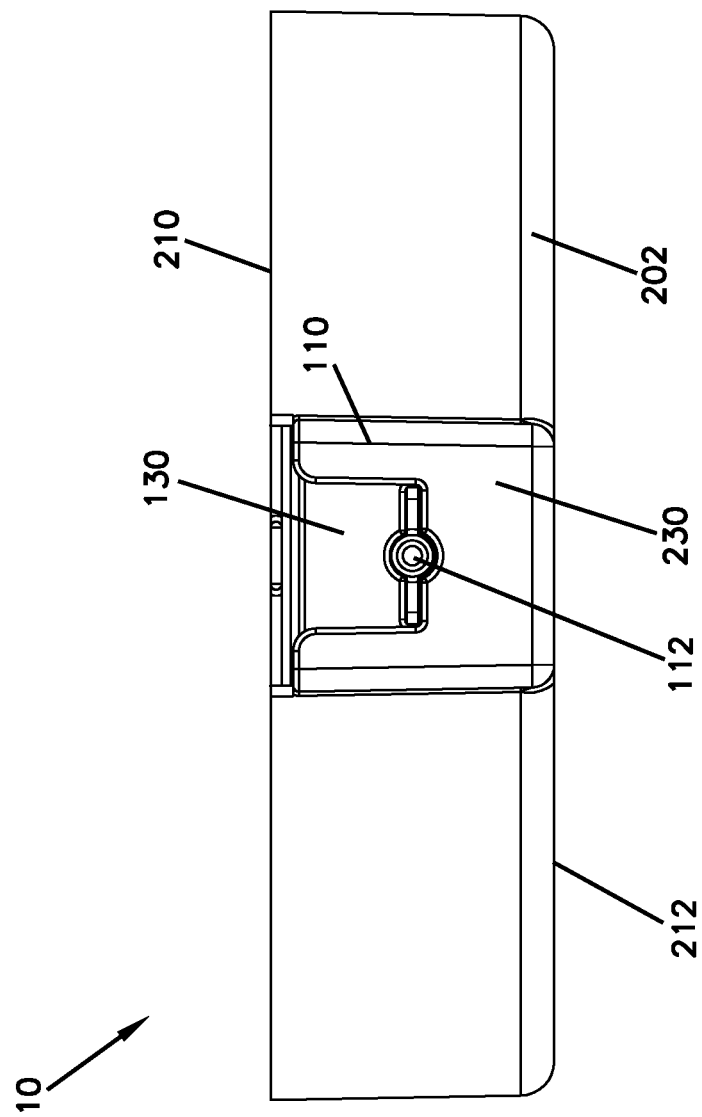
FIG. 13 is a side view of the packaged cable dispenser of FIG. 9.
Figure 14:
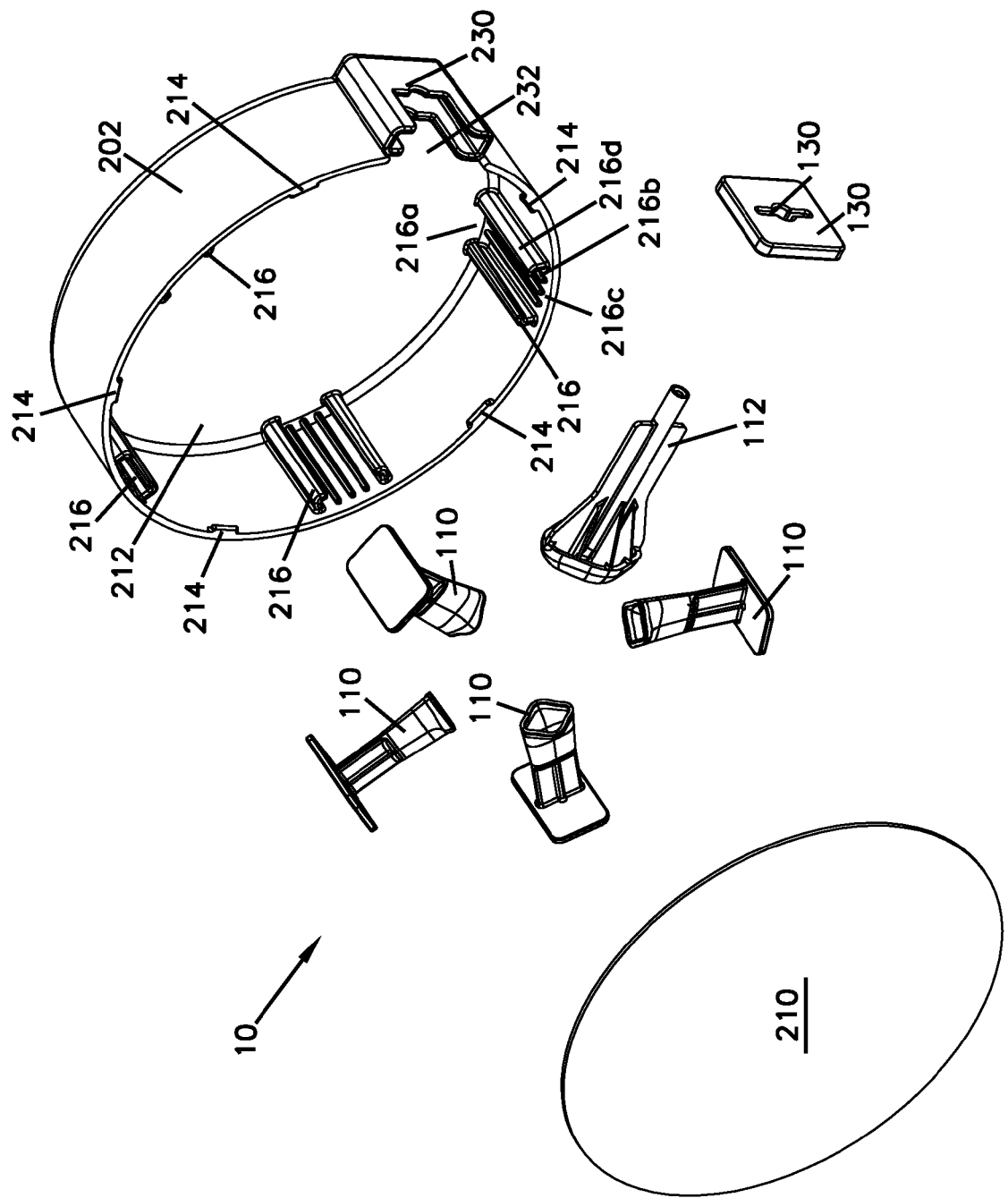
FIG. 14 is an exploded perspective view of the packaged cable dispenser of FIG. 9.
Figure 25:
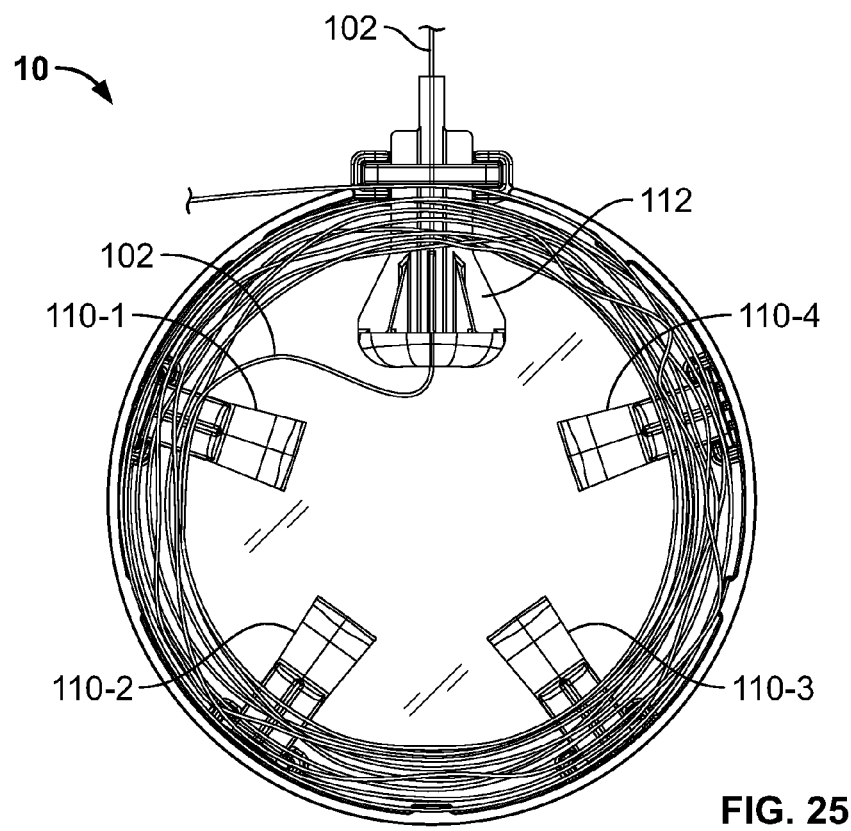
FIG. 25 is a perspective view of the packaged cable dispenser of FIG. 9 while dispensing cable in a first state.
Figure 40:
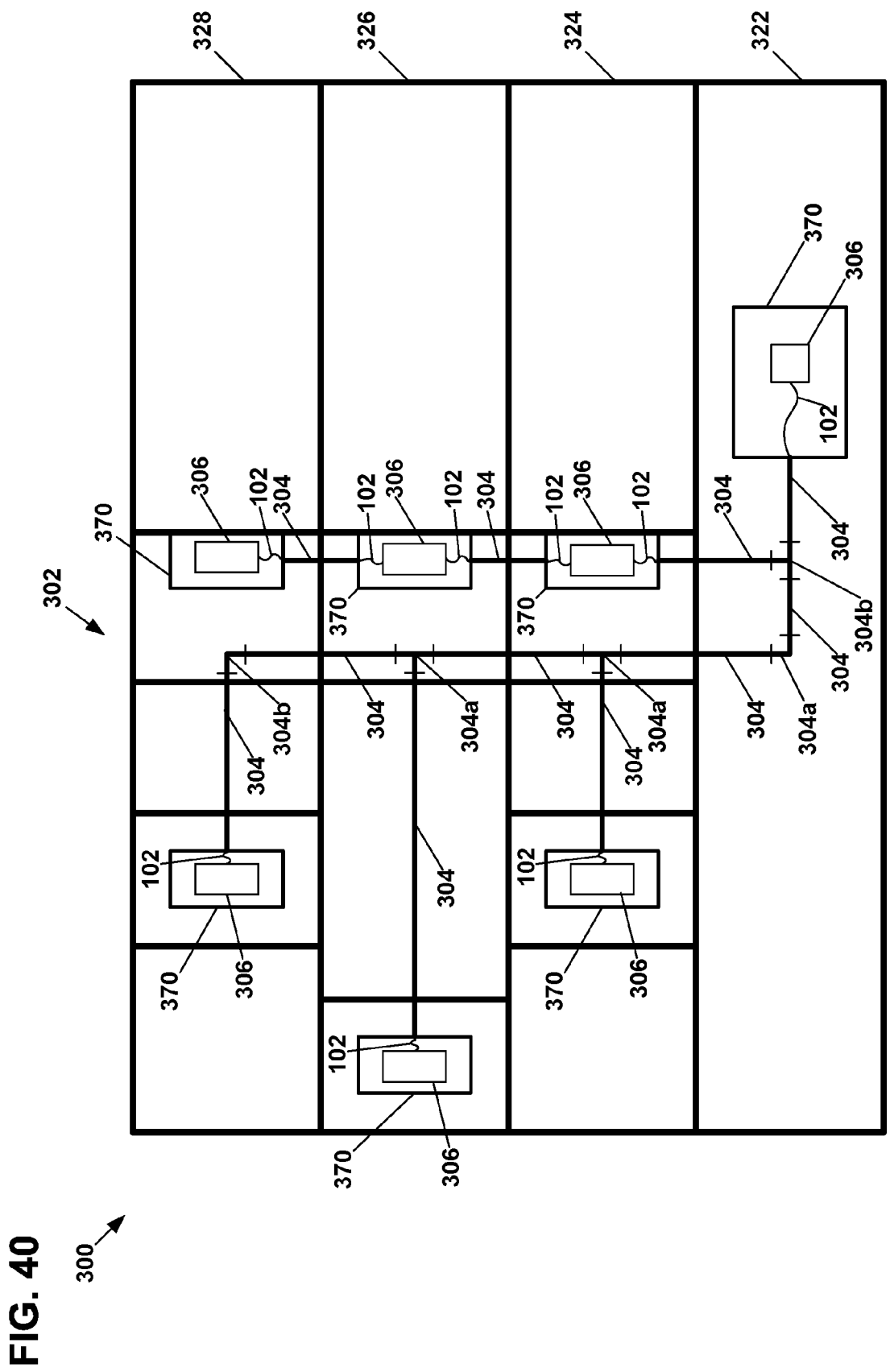
FIG. 40 is a schematic side view of a building structure within which a telecommunications cable system is installed within the micro-conduit system shown in FIG. 11 is installed, wherein the telecommunications cable system includes cables pulled from a coreless wound coil.
Figure 41:
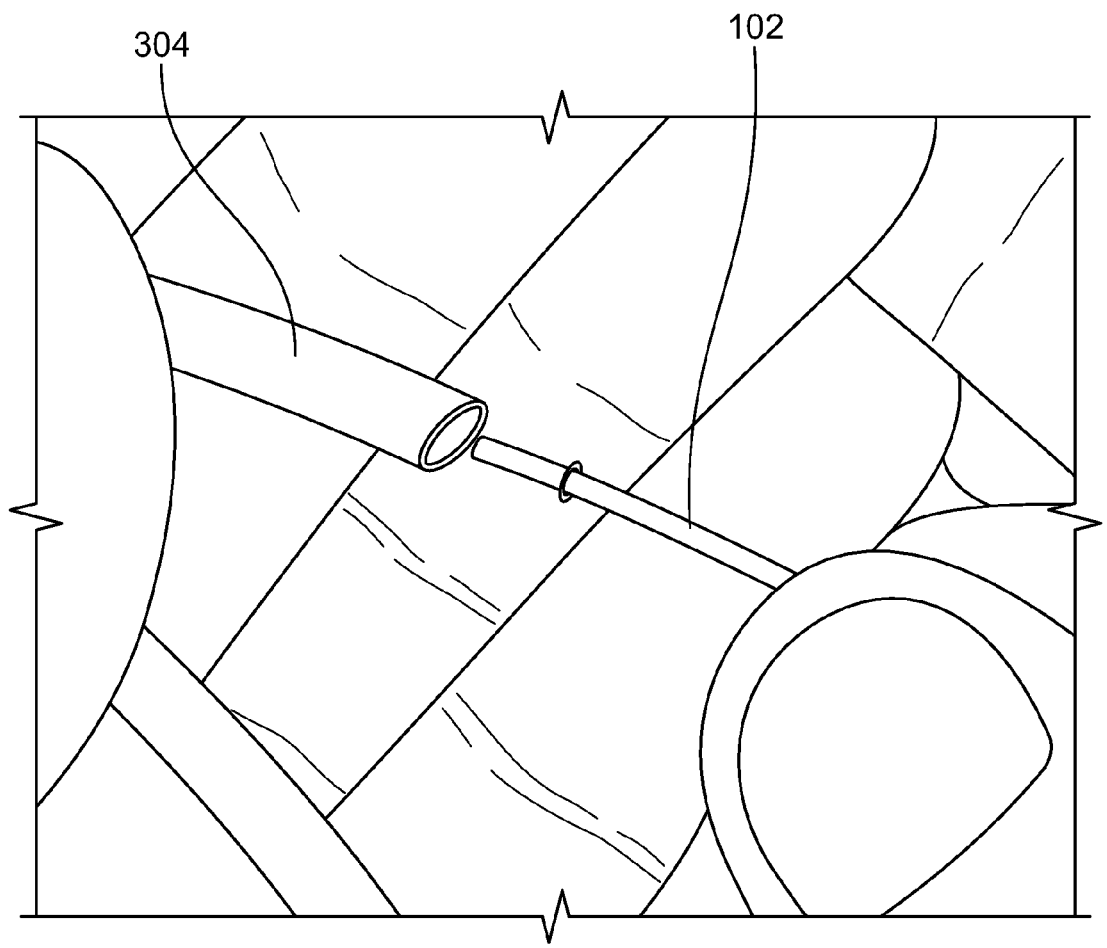
FIG. 41 is a perspective view showing a telecommunications cable being inserted into a micro-conduit.

Referring to FIGS. 37-41, components of a telecommunications distribution system for a building structure 300 having floors 322, 324, 326, and 324 are shown. The building structure 300 is shown as being a multiple dwelling unit, but may be any other type of building structure. Referring to FIG. 11, the building structure 300 is shown as having a conduit assembly 302 extending through at least two floors of the building structure 300. In one example, the conduit assembly 302 is formed from multiple sections of conduit 304, as shown in FIGS. 12-13, joined by various elbows 304a, tees 304b, wyes, and other types of connectors. In one aspect, the conduit sections 304 can be routed to telecommunications distribution housings and/or panels 370. This type of construction can be advantageous where pulling long continuous lengths of conduit is difficult or impracticable due to congestion within the building structure 300. The conduit 304 may be formed to be plenum rated, riser rated, and/or LSHF rated cable. In one embodiment, the conduit 304 is micro-conduit having a nominal internal diameter between about 3 millimeters and 10 millimeters. As shown in FIG. 40, telecommunications cable 102 has been pulled through the conduit assembly 302 and connected to telecommunications equipment 306 to form an installed telecommunications system 308. The system 308 may be further provided in accordance with the systems described in the PCT WO '459 publication. The telecommunications cable 102 can be pulled from either of the previously described and disclosed packaged cable dispensers 10, 10', 10'', 10'''.

Figure 44:
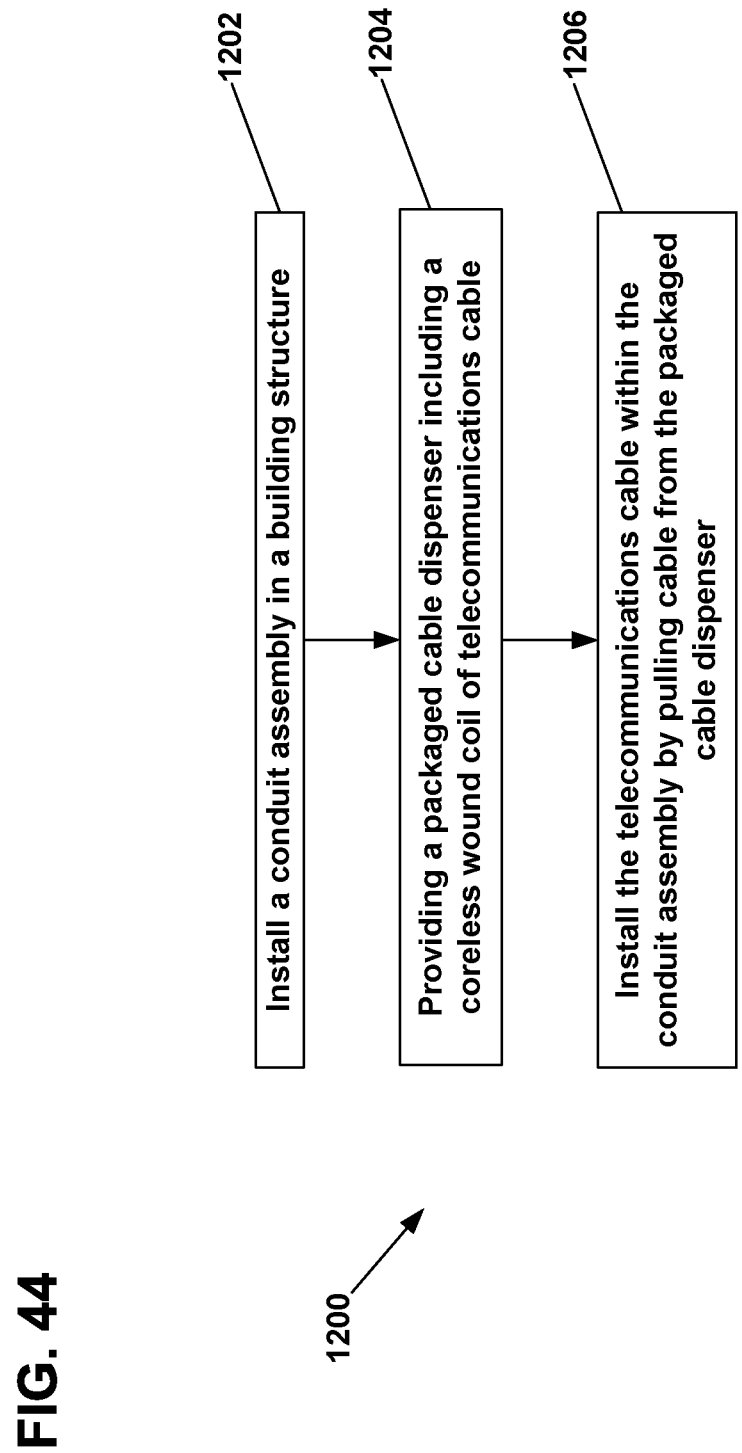
FIG. 44 is a schematic flow chart showing a method for installing a telecommunications distribution system within a building structure utilizing any of the coreless wound coils formed by the methods shown in FIGS. 16 and 17.

Referring to FIG. 44, a method 1200 for installing a telecommunications distribution system within a building structure is shown. One step 1202 may include installing a conduit assembly extending through at least two floors of the building structure. Another step 1204 may include providing a packaged cable dispenser including a coreless wound coil of telecommunications cable. The packaged cable dispenser can be any of the previously described and disclosed packaged cable dispensers. In a step 1206, the telecommunications cable can be installed within the conduit assembly.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

We claim:

1. A cable dispenser comprising:
   a. a length of telecommunications cable wound into a coreless coil defining an interior winding surface and an exterior winding surface, the interior winding surface defining a hollow interior; and
   b. a plurality of winding separators at least partially embedded within the coil wherein the length of telecommunications cable alternately passes on one of the first and second sides of one winding separator and on the other of the first and second sides of an adjacent winding separator.

2. The cable dispenser of claim 1, wherein the plurality of winding separators includes an odd number of winding separators.

3. The cable dispenser of claim 2, wherein the plurality of winding separators includes five winding separators.

4. The cable dispenser of claim 1, wherein one of the winding separators is configured as a payout tube extending from the interior winding surface of the coreless coil to the exterior winding surface of the coreless coil.

5. The cable dispenser of claim 1, wherein each of the plurality of winding separators has a first end and a second end, the first end extending into a hollow interior of the coreless coil, the second end extending to an exterior winding surface of the coreless coil.

6. The cable dispenser of claim 5, wherein at least some of the winding separators each have a base portion at the second end that engages with a corresponding mounting member of a package to secure the wound coil within the package.

7. The cable dispenser of claim 5, wherein the first ends of at least some of the winding separators are provided with a flared end at the first end for preventing the cable from being prematurely unwound.

8. The packaged cable dispenser of claim 7, wherein one of the winding separators is configured as a payout tube having a head portion at the first end and a stem portion at the second end, the stem portion extending through the package sidewall.

9. The cable dispenser of claim 8, wherein the head portion is provided with an elongated outer surface and a funneling surface for guiding the cable through the payout tube as the cable unwinds past the payout tube.

10. The cable dispenser of claim 1, further comprising at least one sidewall to which the winding separators are attached, the at least one sidewall being circular in shape.

11. A packaged cable dispenser package comprising:
   a. a first section defined within the package including:
      i. a length of telecommunications cable wound into a coreless coil defining an interior winding surface and an exterior winding surface, the interior winding surface defining a hollow interior; and
      ii. a plurality of winding separators at least partially embedded within the coil wherein the length of telecommunications cable alternately passes on one of the first and second sides of one winding separator and on the other of the first and second sides of an adjacent winding separator; and
   b. a second section defined within the package including:
      i. a spool portion extending from a common wall between the first and second sections, the spool portion being configured to store excess lengths of the telecommunications cable that has been removed from the coreless coil.

12. The packaged cable dispenser package of claim 11, wherein the package is configured for mounting to an optical network terminal.

13. The packaged cable dispenser package of claim 11, wherein the second section further includes a flange portion extending from the spool.

14. A packaged cable dispenser comprising:
   a. a length of telecommunications cable wound into a coreless coil defining an interior winding surface and an exterior winding surface, the interior winding surface defining a hollow interior b. a plurality of winding separators at least partially embedded within the coil wherein the length of telecommunications cable alternately passes on one of the first and second sides of one winding separator and on the other of the first and second sides of an adjacent winding separator; and c. a winding ring assembly supporting each of the plurality of winding separators at first ends of the winding separators.

15. The packaged cable dispenser of claim 14, wherein:

a. the winding ring assembly is separable into a first part and a second part.

16. The packaged cable dispenser of claim 15, wherein at least one of the winding separators is separable into a first part and a second part and wherein the winding ring assembly is separable into a first part and a second part.

17. The packaged cable dispenser of claim 14, wherein at least one of the winding separators is separable into a first part and a second part.

18. A method for making a coreless wound coil of telecommunications cable, the method comprising the steps of:

a. providing a mandrel assembly having a longitudinal axis about which the mandrel is rotatable;

b. providing an odd number of at least three winding separators, each of the winding separators having a first side and an opposite second side;

c. securing the winding separators to the mandrel assembly;

d. securing an end of the telecommunications cable to the mandrel;

e. rotating the mandrel assembly to cause the telecommunications cable to be wound about the mandrel to form a wound coil of telecommunications cable; and f. weaving the telecommunications cable between the winding separators as the telecommunications cable is being wound onto the mandrel such that the telecommunications cable alternately passes on one of the first and second sides of one winding separator and on the other of the first and second sides of an adjacent winding separator.

19. The method for making a wound coil of telecommunications cable of claim 18, further comprising the step of removing the wound coil of telecommunications cable from the mandrel assembly with the winding separators embedded at least partially within the wound coil of telecommunications cable.

20. The method of making a wound coil of telecommunications cable of claim 19, further comprising the step of placing the wound coil of telecommunications cable into a package to form a packaged coil dispenser.

21. The method for making a wound coil of telecommunications cable of claim 18, wherein the step of providing an odd number of at least three winding separators includes providing one of the winding separators as a payout tube.

22. The method for making a wound coil of telecommunications cable of claim 18, wherein the step of providing an odd number of at least three winding separators includes providing five winding separators.

23. The method for making a wound coil of telecommunications cable of claim 18, further comprising installing a connector onto an end of the telecommunications cable.

* * * * *